(12) United States Patent
Gustafson et al.

(10) Patent No.: US 6,752,924 B2
(45) Date of Patent: Jun. 22, 2004

(54) BOWL-CARTRIDGE FILTER HAVING INTERLOCK MECHANISM AND METHODS

(75) Inventors: Michael J. Gustafson, Burnsville, MN (US); Bernard A. Matthys, Apple Valley, MN (US); Eivind Stenersen, River Falls, WI (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 10/109,810

(22) Filed: Mar. 28, 2002

(65) Prior Publication Data

US 2002/0170279 A1 Nov. 21, 2002

Related U.S. Application Data

(60) Provisional application No. 60/280,786, filed on Apr. 2, 2001.

(51) Int. Cl.[7] .......................... B01D 27/08; B01D 35/30; B01D 35/31
(52) U.S. Cl. ....................... 210/232; 210/238; 210/444; 210/450; 210/493.2
(58) Field of Search ................................. 210/232, 238, 210/444, 450, 493.2; 55/502, 503

(56) References Cited

U.S. PATENT DOCUMENTS

| | | | |
|---|---|---|---|
| 5,035,797 A | | 7/1991 | Janik |
| 5,171,430 A | * | 12/1992 | Beach et al. |
| 5,538,626 A | * | 7/1996 | Baumann |
| 5,548,893 A | * | 8/1996 | Koelfgen |
| 5,549,821 A | | 8/1996 | Bounnakhom et al. |
| 5,556,542 A | | 9/1996 | Berman et al. |
| 5,643,448 A | * | 7/1997 | Martin et al. |
| 5,681,461 A | | 10/1997 | Gullett et al. |
| 5,685,985 A | | 11/1997 | Brown et al. |
| 5,702,602 A | | 12/1997 | Brown et al. |
| 5,738,785 A | | 4/1998 | Brown et al. |
| 5,770,065 A | | 6/1998 | Popoff et al. |
| 5,846,416 A | | 12/1998 | Gullett |
| 6,139,738 A | | 10/2000 | Maxwell |
| 6,146,527 A | * | 11/2000 | Oelschlaegel |
| 2003/0024870 A1 | * | 2/2003 | Reinhart |

FOREIGN PATENT DOCUMENTS

| | | | |
|---|---|---|---|
| BE | 1 011 567 A | | 11/1999 |
| EP | 844012 | * | 5/1998 |
| EP | 0 880 987 A | | 12/1998 |

* cited by examiner

Primary Examiner—Thomas M. Lithgow
(74) Attorney, Agent, or Firm—Merchant & Gould P.C.

(57) ABSTRACT

A bowl-cartridge filter includes a filter cartridge and a bowl. The filter cartridge includes an interlock arrangement that is oriented to engage the filter bowl, when the filter cartridge is mounted in the filter bowl, and the bowl is rotated in a direction to remove the bowl-cartridge filter from a filter head. The filter bowl includes a cooperating interlock arrangement that engages the interlock arrangement on the filter cartridge. Example embodiments include cog arrangements, which include a plurality of projecting teeth. Various shapes for the teeth are possible, including house-shaped, truncated A-shaped, and pie wedged shape.

22 Claims, 20 Drawing Sheets

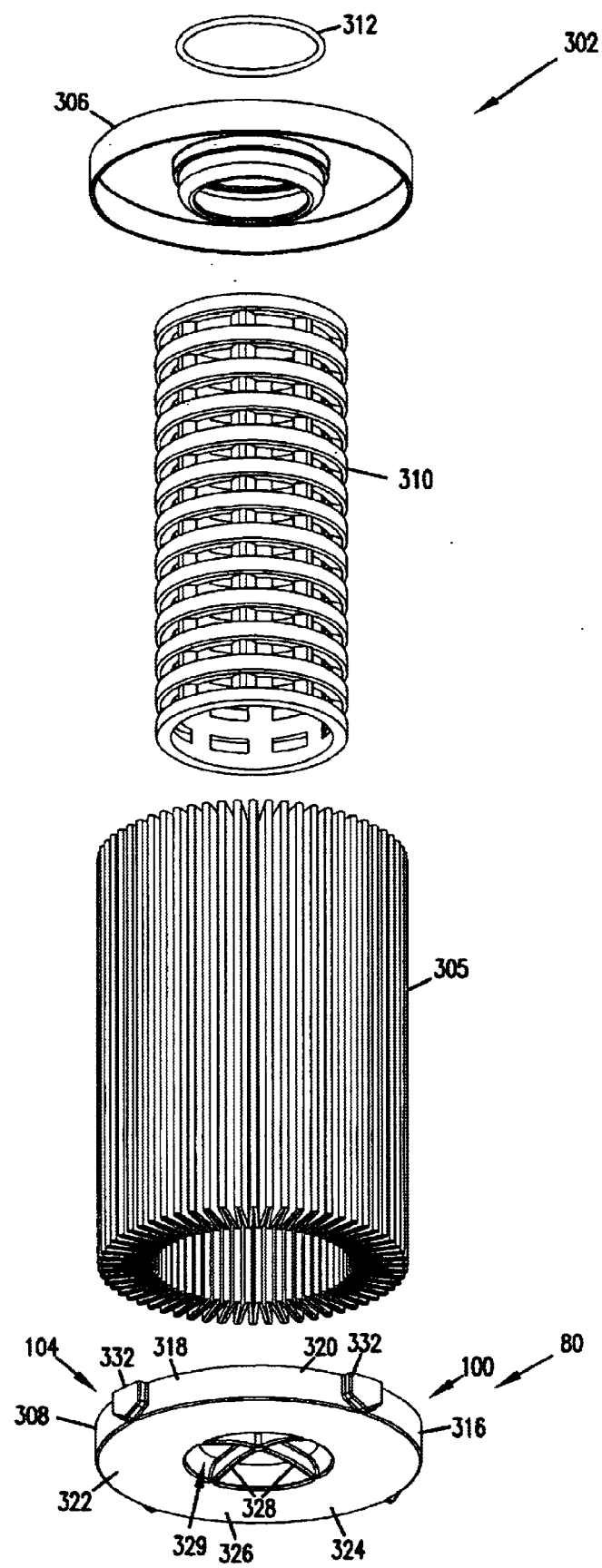

BOWL-CARTRIDGE FILTER HAVING INTERLOCK MECHANISM AND METHODS

This application claims priority under 35 U.S.C. § 119(e) to provisional application, Serial No. 60/280,786, filed Apr. 2, 2001. Application Ser. No. 60/280,786 is incorporated by reference herein.

TECHNICAL FIELD

This disclosure concerns generally filters, in particular filters for cleaning fluid, such as liquids including oil, fuel, and hydraulics. The disclosure also concerns methods of construction, assembly, and use.

BACKGROUND OF THE INVENTION

Filters are commonly used in connection with lubrication systems and fuel systems for internal combustion engines, and hydraulic systems for heavy-duty equipment. Filters are also used in many types of liquid systems. In these types of systems, the filter is changed periodically. One of the standard type of filters used in the art is a bowl-cartridge filter.

All-cartridge filters typically include a reusable bowl holding a replaceable cartridge filter (filter element). Bowl-cartridge filters are mounted onto a filter head, wherein liquid to be cleaned passes through the filter head, into the bowl, through the replaceable cartridge filter, outside of the bowl, and back into the filter head. After a period of use, the bowl-cartridge filter is removed from the filter head, and the replaceable cartridge filter is removed from the reusable bowl. The old cartridge filter is discarded, and replaced with a new cartridge filter. The new cartridge filter is operably mounted into the reusable bowl, to provide a refurbished bowl-cartridge filter. This refurbished bowl-cartridge filter, containing the new cartridge filter, is than mounted onto the filter head.

SUMMARY

A bowl-cartridge filter is disclosed having a filter cartridge and a bowl. The filter cartridge includes an interlock arrangement that is oriented to engage a filter bowl, when the filter cartridge is mounted in the filter bowl and the bowl is rotated in a direction to remove the bowl-cartridge filter from a filter head.

Preferably, the filter bowl includes a cooperating interlock arrangement that engages the interlock arrangement on the filter cartridge.

Methods of servicing, use, and construction are provided.

BRIEF DESCRIPTION OF THE DRAWINGS

FIG. 22 is an exploded, perspective view of another embodiment of a cartridge filter constructed according to principles of this disclosure;

DETAILED OF THE PREFERRED EMBODIMENT

A. Problems With Existing Arrangements

In a typical system that utilizes a bowl-cartridge filter, the bowl-cartridge filter is rotatably secured to a filter head. After a period of use, it will become necessary to service the bowl-cartridge filter. This is done by removing the bowl-cartridge filter from the filter head, and then removing the filter cartridge from the bowl. The filter cartridge is discarded and replaced with a new filter cartridge. The refurbished bowl-cartridge filter is then reattached to the filter head.

When the bowl-cartridge filter is removed from the filter head, the cartridge filter may sometimes remain attached to the filter head. When this happens, the fluid in the cartridge filter drips and spills into the environment.

Improvements are desirable. Arrangements described herein help to reduce problems associated with bowl-cartridge filters, such as the problems described above, and others.

B. The Arrangements of FIGS. 1–12

Figure 1:
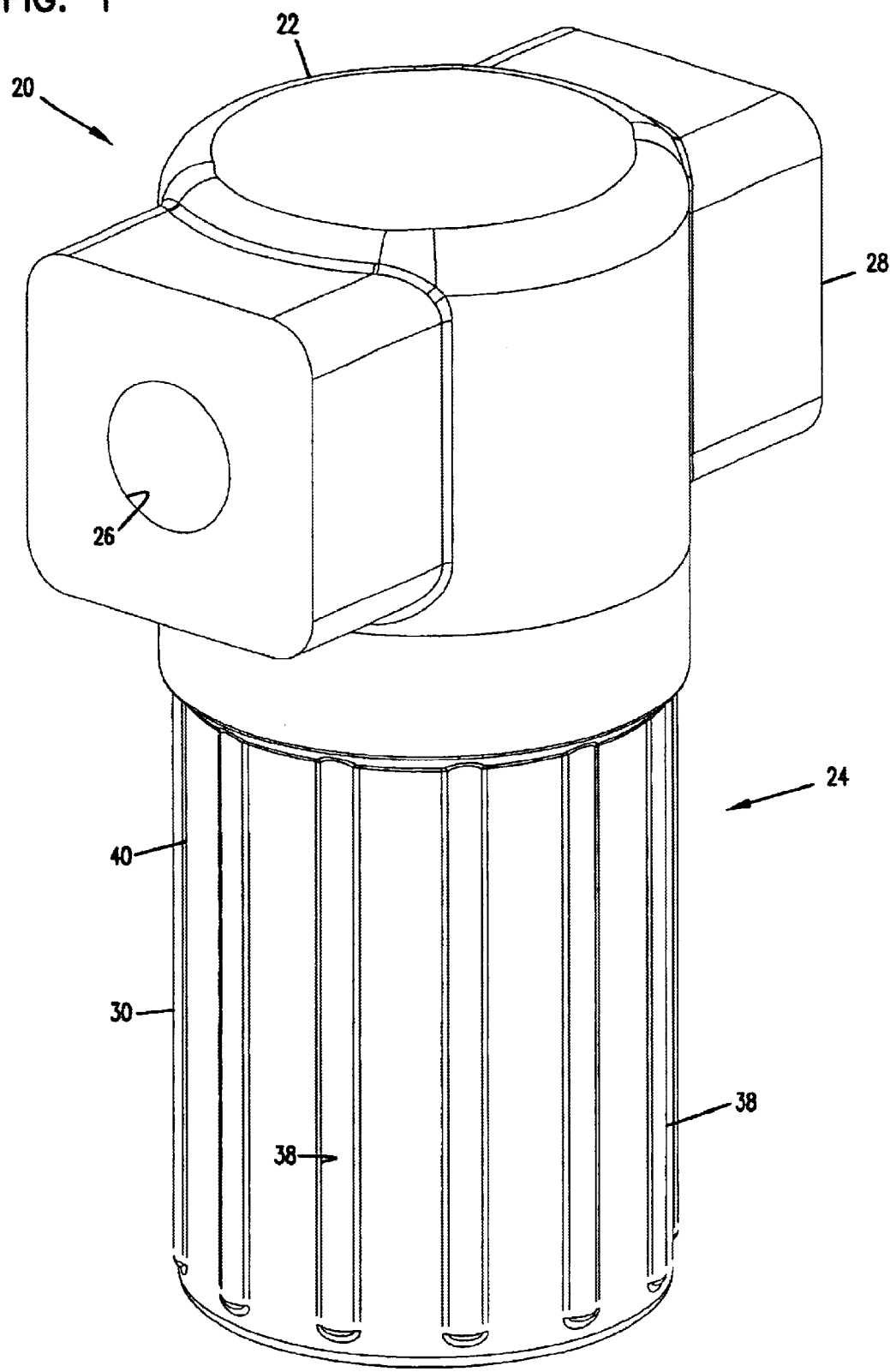
FIG. 1 is a perspective view of an embodiment of a bowl-cartridge filter secured to a filter head, constructed according to principles of this disclosure.

An example of an improved bowl-cartridge filter constructed according to the present invention is illustrated in FIG. 1, in perspective view. A filtration system including a filter head 22 and a bowl-cartridge filter 24 is illustrated. The bowl-cartridge filter 24 is shown as being secured to the filter head 22, usually in a manner that permits the bowl-cartridge filter 24 to be spun onto the filter head 22 or otherwise rotated and secured thereto. Typically, the bowl-cartridge filter 24 is secured to the filter head 22 by a threaded connection. The filter head 22 may be constructed according to conventional, known filter heads; In general, the filter head 22 includes a liquid inlet port 26 and a liquid outlet port 28. Liquid to be cleaned flows into the filter head 22 through the inlet port 26, then into the bowl-cartridge filter where it passes through filtration media to be cleaned, and finally flows in a cleaned condition back into the filter head 22 and exists through the outlet port 28.

Figure 2:
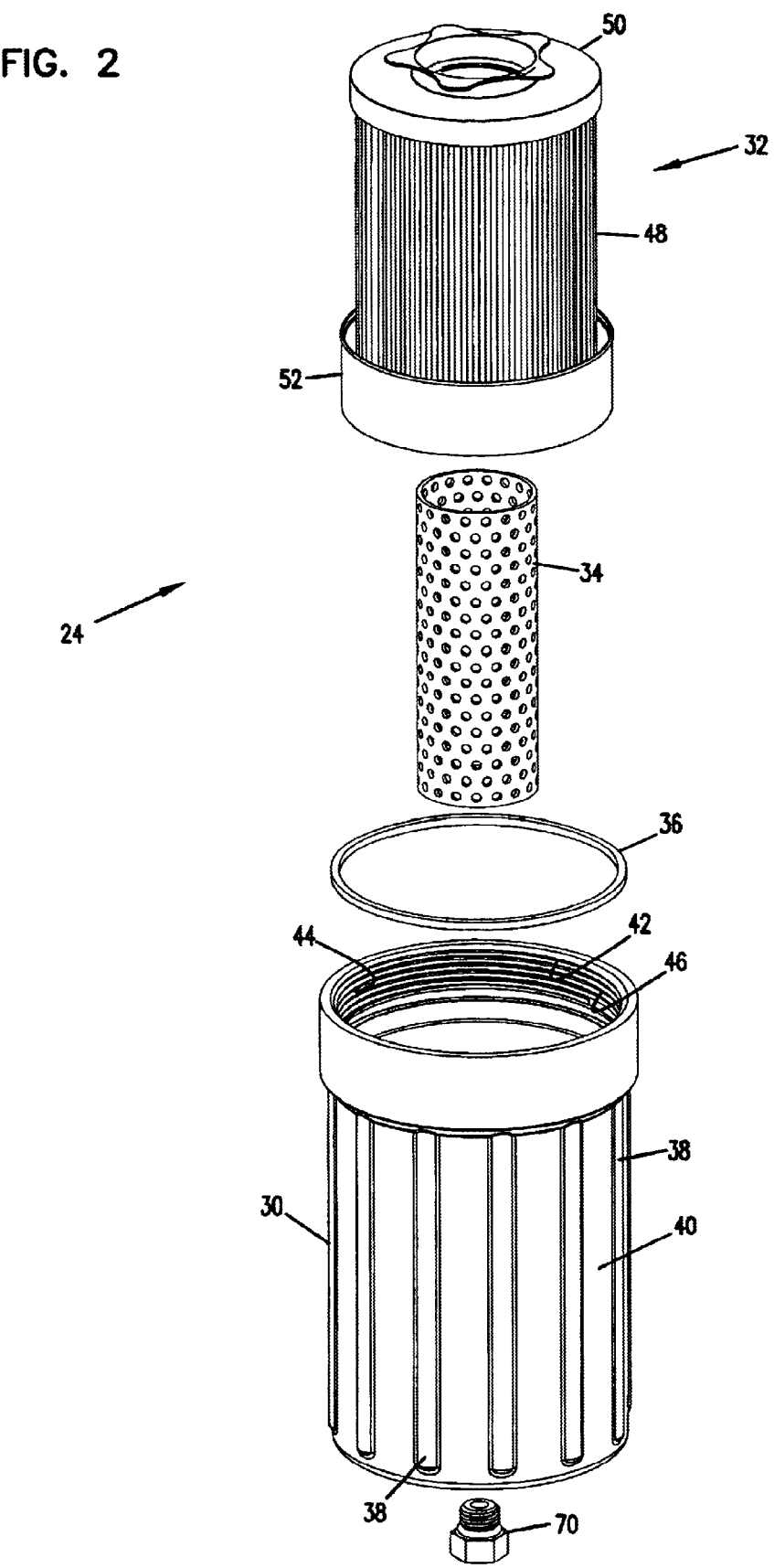
FIG. 2 is an exploded, perspective view of the bowl-cartridge filter depicted in FIG. 1.

Turning now to the bowl-cartridge filter 24, the assembly is shown in exploded, perspective view in FIG. 2. The illustrated bowl-cartridge filter 24 includes a can or filter housing 30 holding or containing therein a removable, replaceable, disposable filter cartridge 32. The bowl-cartridge filter 24 also includes an inner liner, support, or center tube 34. In this particular arrangement, there is also a seal ring 36.

From a review of FIGS. 1 and 2, it can be appreciated that the housing 30 preferably includes a plurality of grooves 38 along an exterior surface 40 of the housing 30, to enhance the ease of gripping and manipulation of the housing 30 relative to the filter head 22. It can also be seen in FIG. 2 that the housing 30 includes a threaded region 42 including a series of threads along an interior surface 46 to permit the filter housing 30 to be threadably connected to the filter head 22 for operable assembly.

A review of FIG. 2 illustrates some of the basic features of the filter cartridge 32. In general, the preferred filter cartridge 32 illustrated includes an extension of filter media 48 extending between a first end cap 50 and a second end cap 52. The media 48 functions to inhibit the passage of particulate matter in liquid flowing through it, in order to clean or purify the liquid passing through the bowl-cartridge filter 24.

The filter cartridge 32 and the bowl 30 cooperate with each other to ensure that when the bowl 30 is rotated off of the filter head 22, the filter cartridge 32 rotates with the bowl 30 and is also removed from the filter head 22. This cooperative relationship is explained in more detail below.

Figure 3:
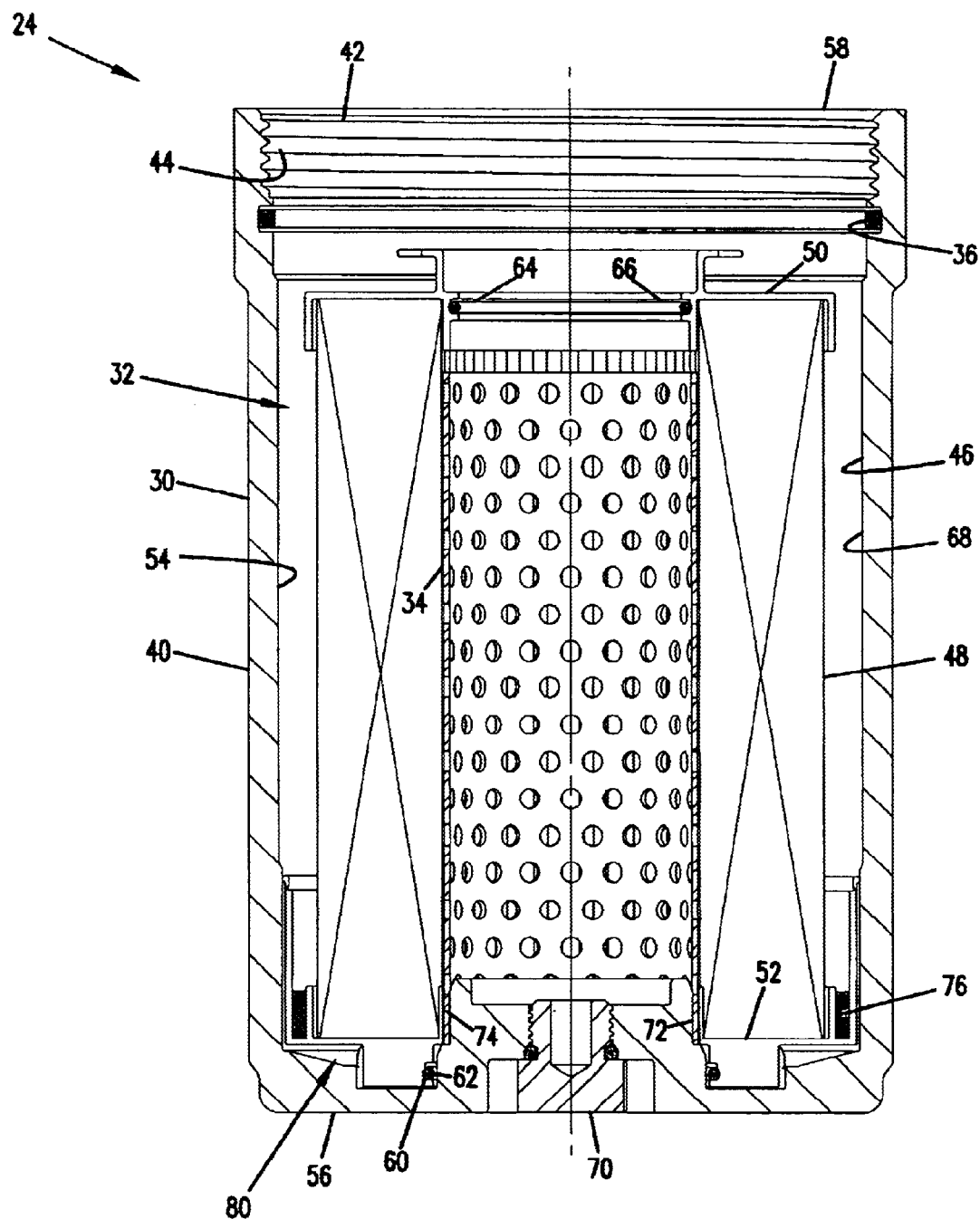
FIG. 3 is a schematic, cross-sectional view of the bowl-cartridge filter depicted in FIG. 1, but not secured to the filter head.

Turning now to FIG. 3, a schematic, cross-sectional view of the bowl-cartridge filter 24 is depicted. As can be seen in FIG. 3, the bowl 30 depicted is generally cylindrical in shape and defines an open interior 54. The bowl 30 further includes a closed end 56 and an open end 58. In the one depicted in FIG. 3, the open end 58 is adjacent to the threaded region 42. The open end 58 allows access into the open interior 54, to permit the installation and removal of the filter cartridge 32 therein.

The seal ring 36 is preferably provided circumferentially lining the interior surface 46 of the bowl 30 and provides a seal with the filter head 22 in order to inhibit the leaking of liquid between the filter head 22 and the bowl-cartridge filter 24.

In the preferred arrangement depicted, the second end cap 52 is adjacent to the closed end of the bowl 30. A seal ring 60 is preferably provided between the second end cap 52 and the interior surface 46 of the bowl 30 to create a seal 62 therebetween and inhibit the passage of liquid from a dirty side to a clean side without passing through the media 48 first.

In the preferred embodiment depicted in FIG. 3, an o-ring 64 is mounted within the opening 66 defined by the first end cap 50. The o-ring 64 creates a seal with the filter head 22 to inhibit the passage of liquid between a dirty side and a clean side without first passing through the filter media 48.

In a forward flow system, liquid to be cleaned flows from the filter head 22 and into an unfiltered liquid volume 68. In the one depicted in FIG. 3, the unfiltered liquid volume 68 is the volume of space between the interior surface 46 of the bowl 30 and the filter media 48. The liquid to be filtered then passes through the media 48, where the passage of particles is inhibited and generally trapped. The liquid then flows through the center tube 34 and then exits the bowl-cartridge filter 24 and passes into the filter head 22. In a reverse-flow system, the liquid may pass first through the opening in the first end cap 50, into the center tube 34, through the filter media 48, into the volume 68 (which would then be a filtered liquid volume), and then exit the bowl-cartridge filter 24 into the filter head 22.

In the one depicted in FIG. 3, this particular bowl 30 further includes an end plug 70 that aids in the draining of liquid from the bowl 30 when servicing the bowl-cartridge filter 24.

Preferably, the center tube 34 is a permanent, non-disposable member of the bowl-cartridge filter 24. In the preferred example depicted in FIG. 3, the center tube 34 is secured to the bowl 30 at a projection 72 in the bowl 30 by a press fit. The projection 72 is generally cylindrical in shape, having an outer annular surface 74. The center tube 34 engages the outer annular surface 74 and circumscribes it in a press fit manner. The press fit should be tight enough and secure enough to securely fasten the center tube 34 to the bowl 30 and prevent the center tube 34 from being removed from the bowl 30 when the filter cartridge 32 is removed from the bowl 30.

FIG. 3 also depicts the bowl 30 and filter cartridge 32 engaged between a cooperative interlock arrangement 80 that helps to ensure removal of the filter cartridge 32 from the filter head 22 at the same time the bowl 30 is removed from the filter head 22. This is detailed further below.

The particular filter cartridge 32 depicted also includes a second region of filter media 76 held by the second end cap 52, which helps to clean unfiltered liquid in the process of servicing the bowl-cartridge filter 24. These features are characterized more fully in commonly assigned, and co-pending U.S. patent application Ser. No. 60/280,787, filed on Apr. 2, 2001, and entitled "Filter Cartridge for a Filter Assembly", incorporated herein by reference. With respect to the interlock arrangement 80, no particular filter cartridge 32 is preferred. The filter cartridge 32 depicted is merely one example, and in many instances, with respect to the interlock arrangement 80, will not have the second region of media 76 or some of the other features filly characterized in application Ser. No. 60/280,787.

Figure 4:
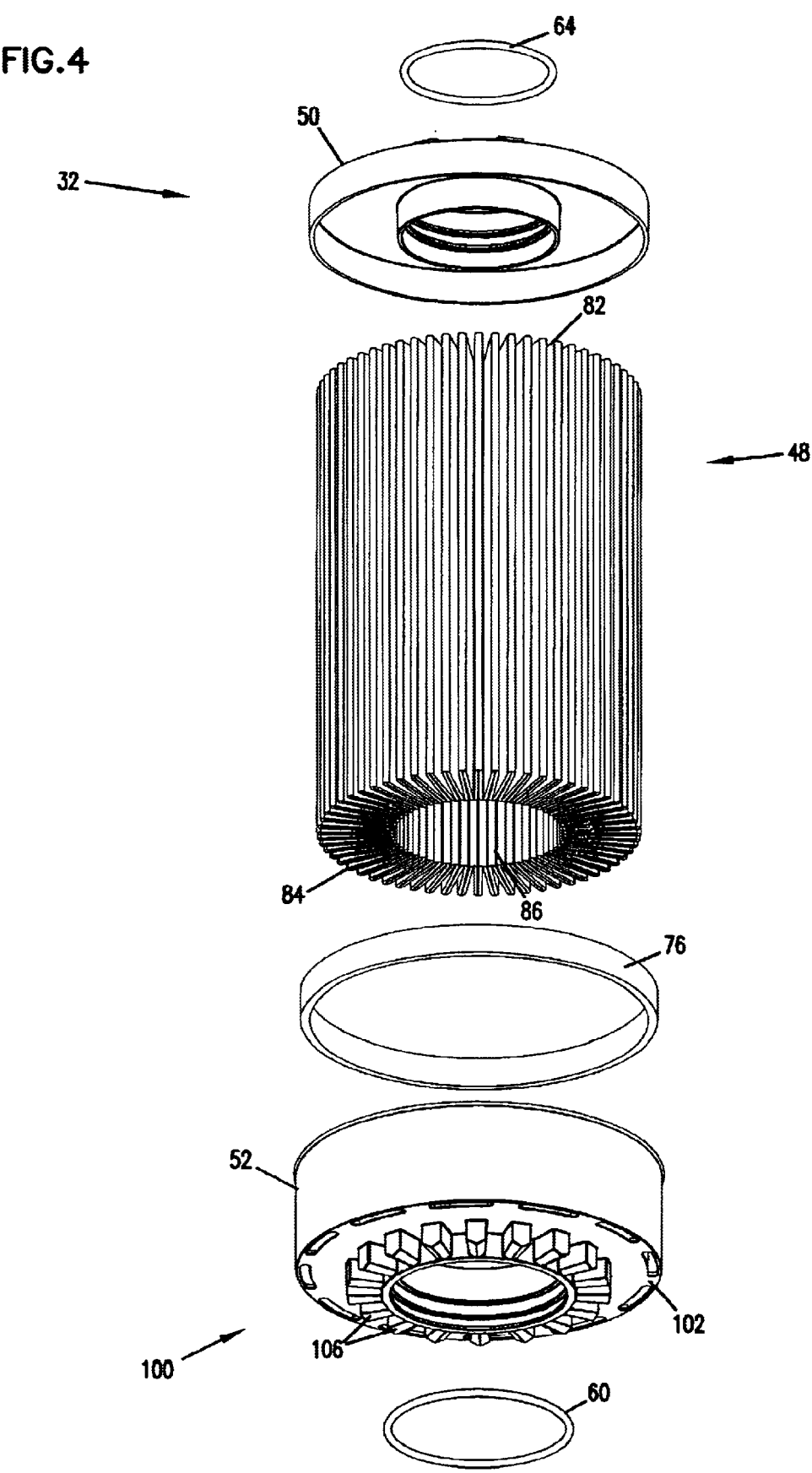
FIG. 4 is an exploded, perspective view of the cartridge filter depicted in FIGS. 2 and 3.
Figure 5A:
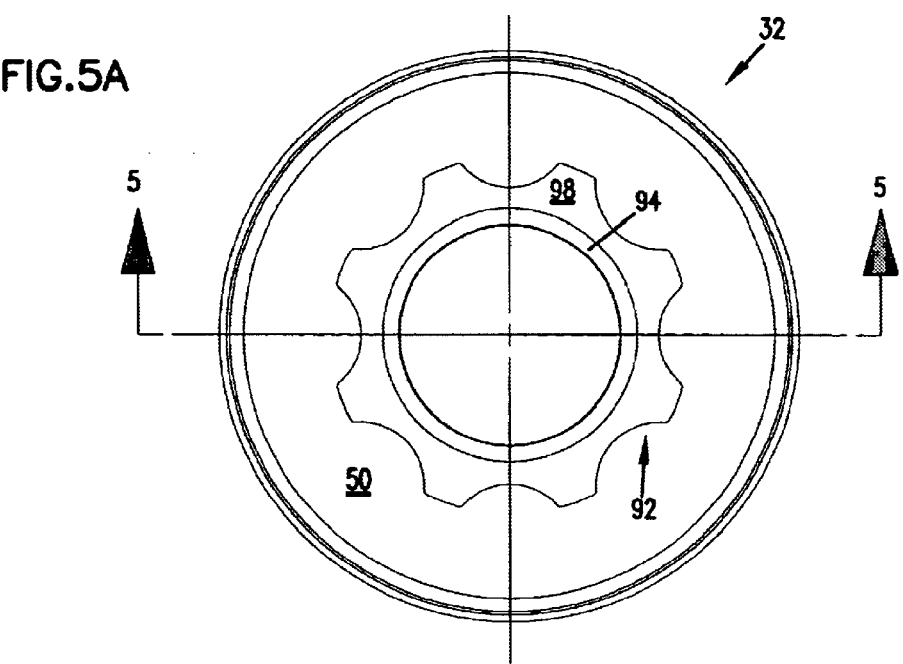
FIG. 5A is an end view of the filter cartridge depicted in FIGS. 4 and 5.
Figure 5:
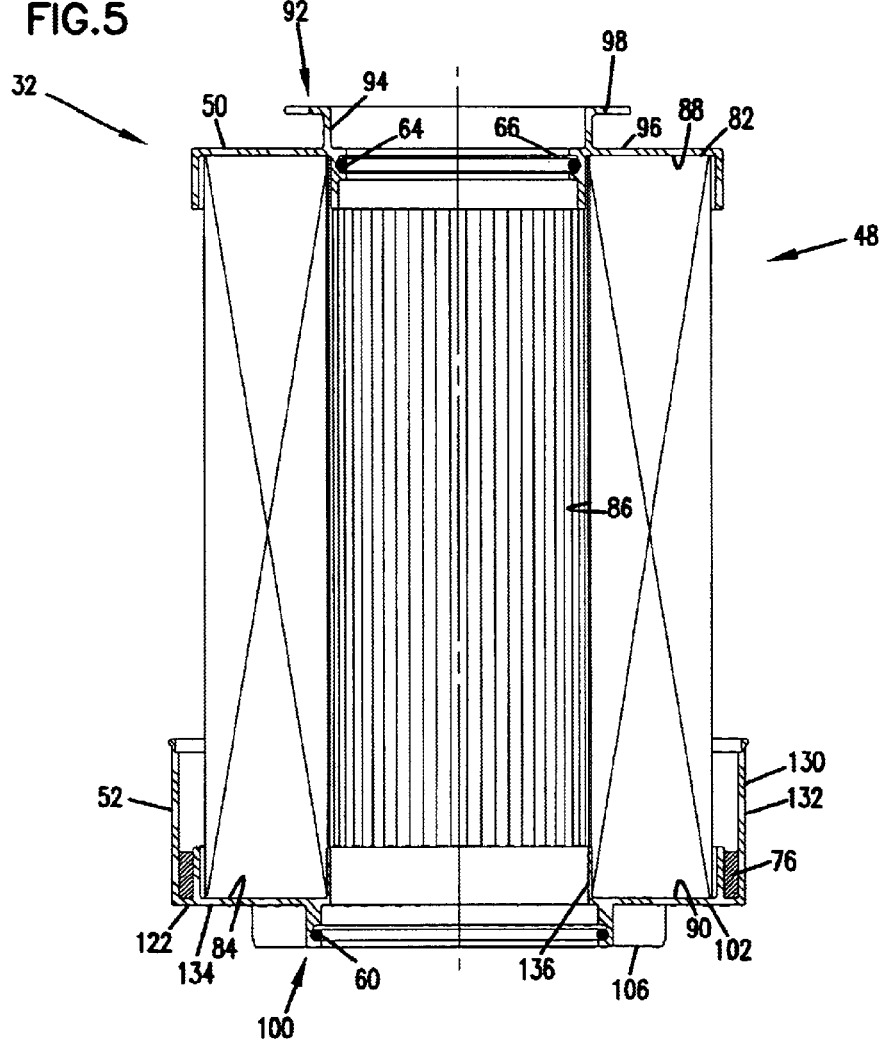
FIG. 5 is a schematic, cross-sectional view of the cartridge filter removed from the filter bowl depicted in FIG. 3.

Turning now to FIG. 4, the example filter cartridge 32 is depicted in exploded perspective view. In FIG. 5, the filter cartridge 32 with end cap 52 is depicted in schematic cross-section. As can be seen in FIGS. 4 and 5, the depicted extension of media 48 is generally cylindrical having a first end 82, an opposite second end 84, and an open interior volume 86. The first end 82 is adjacent to and in contact with an inner surface 88 of the first end cap 50, while the second end 84 is adjacent to and in contact with an inner surface 90 of the second end cap 52. In preferred arrangements, the media 82 is made from cellulose, or synthetic material, or a blend of the two. Other materials may be used, depending upon the particular system and application.

In preferred arrangements, the extension of media 48 is secured to the first and second end caps 50, 52 by, for example, bonding. In many preferred arrangements, the media 48 is bonded to the first and second end caps 50, 52 through either adhesive or urethane potting material.

In the particular filter cartridge 32 depicted in FIG. 5, the first end cap 50 includes a handle member 92. While a variety of structures may be provided, the particular handle member 92 depicted includes: (i) a projection 94 extending axially from a remaining portion 96 of the end cap 50; and, (ii) a circumferential rim 98 extending from the projection 94. The projection 94 and rim 98 are preferably shaped and spaced from the remaining portion 96 to allow for the fingers of a person or, alternatively, tools to grasp the handle member 92 and remove the filter cartridge 32 from the bowl 30.

The filter cartridge 32 includes an interlock arrangement 100, which forms part of the cooperative interlock arrangement 80 between the filter cartridge 32 and bowl 30. In the preferred embodiment depicted, the cartridge interlock arrangement 100 extends from an outer surface 102 of the second end cap 52.

Figure 9:
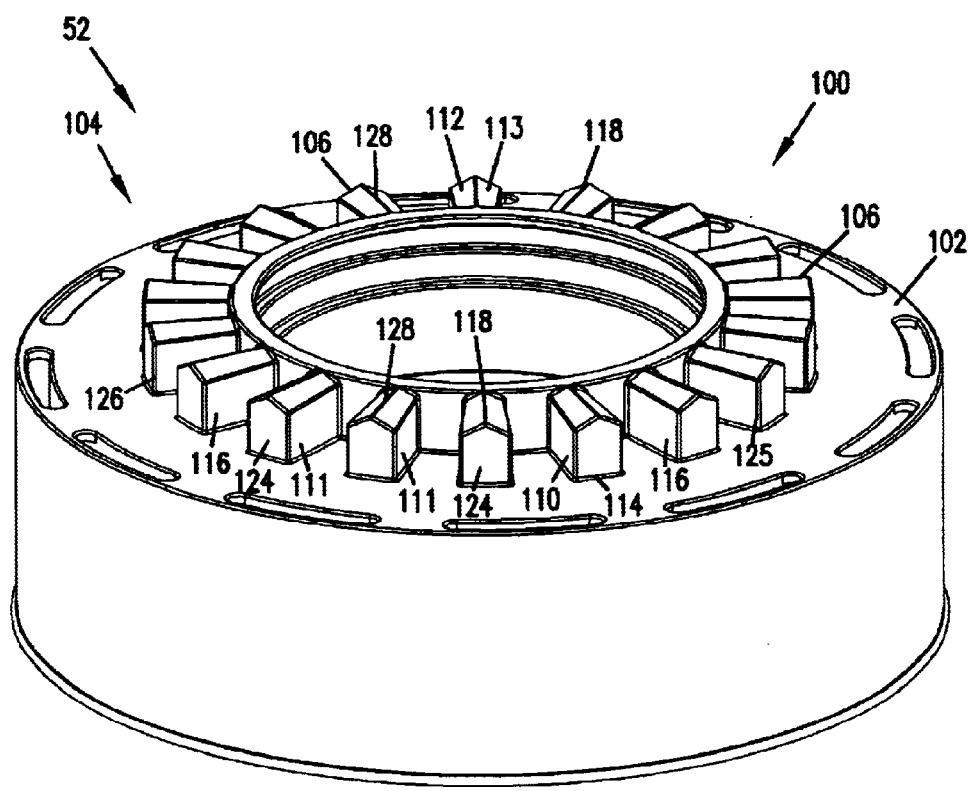
FIG. 9 is a perspective view of an end cap utilized as part of the filter cartridge depicted in FIGS. 2, 4, and 5.
Figure 10:
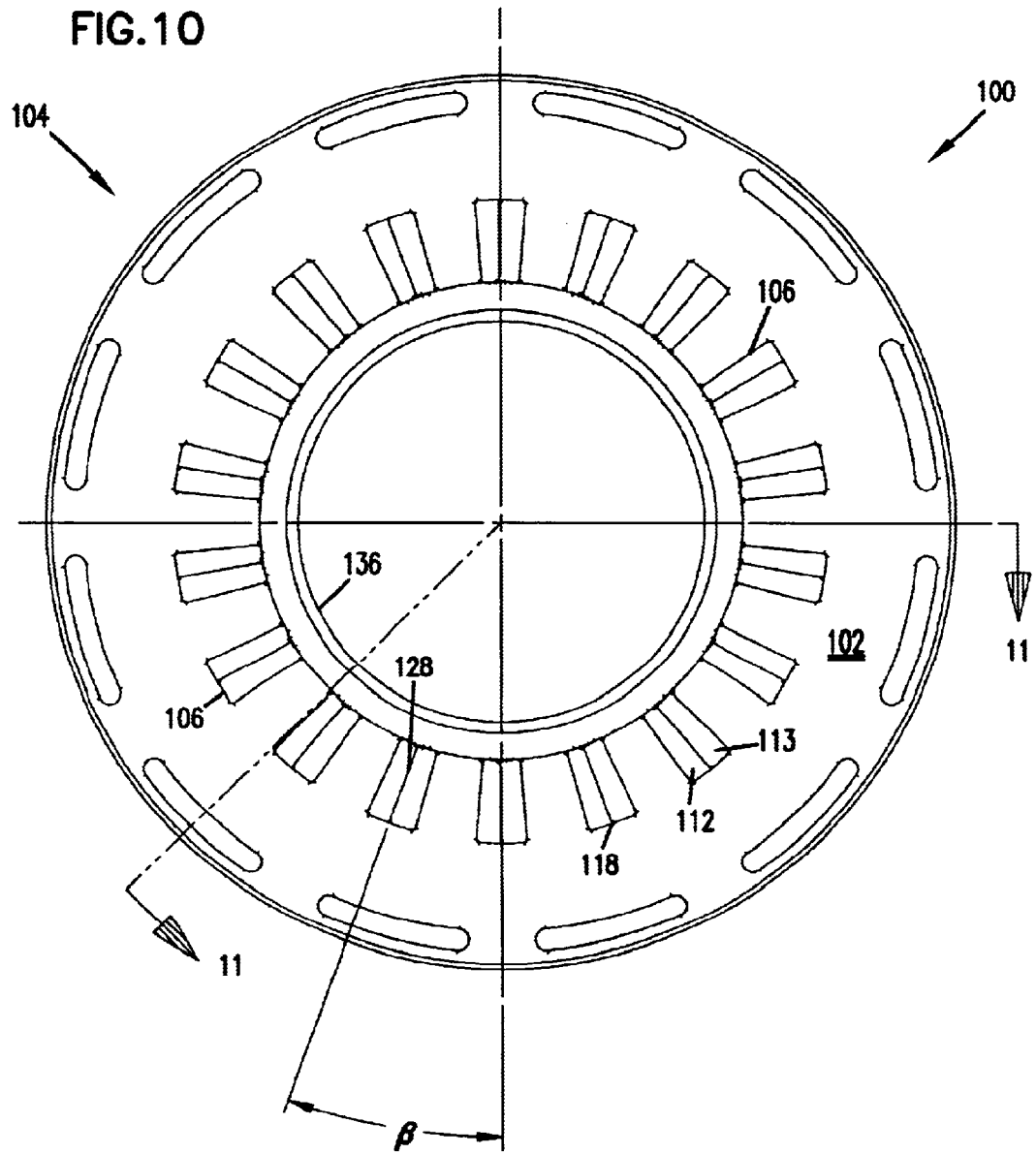
FIG. 10 is a top plan view of the end cap depicted in FIG. 9.
Figure 11:
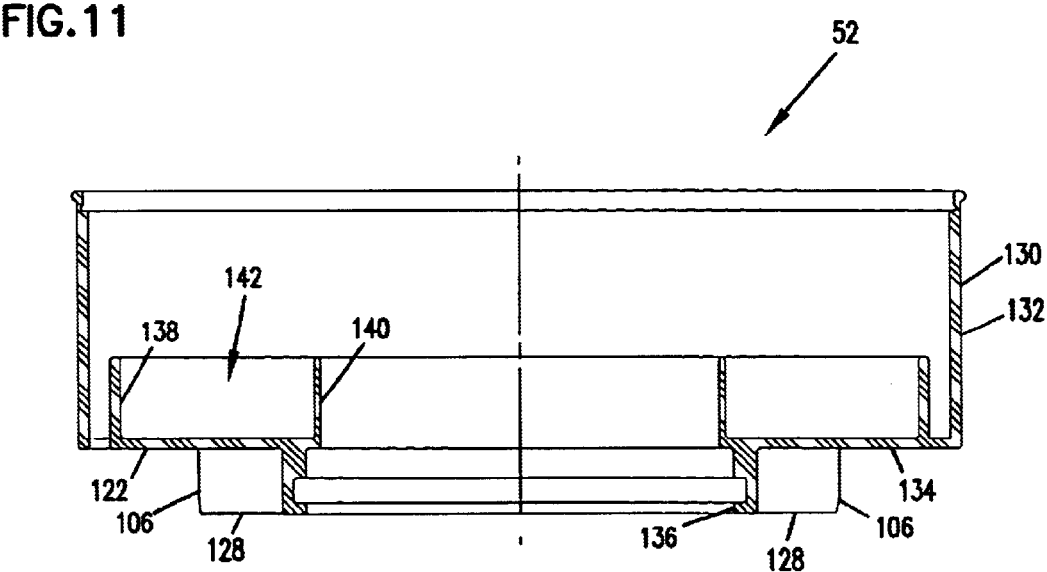
FIG. 11 is a schematic, cross-sectional view of the end cap taken along the line 11—11 in FIG. 10.

One preferred cartridge interlock arrangement 100 is illustrated in greater detail in FIGS. 9–11. The cartridge interlock arrangement 100 depicted generally forms a cog construction 104 in order to cooperate with compatible structure in the bowl 30. The cog construction 104 includes at least one cog or tooth 106 extending from the outer surface 102 of the second end cap 52. In preferred embodiments, the cog construction 104 includes at least two teeth 106 extending from the outer surface 102. In the particular embodiment illustrated, the cog construction 104 has 18 teeth 106. It is contemplated that many preferred arrangements will include no more than 30 teeth and typically 5–25 teeth. Each of the teeth 106 is oriented to engage the filter bowl 30, when the filter cartridge 32 is mounted in the filter bowl 30 and the bowl 30 is rotated in a direction to remove the bowl-cartridge filter 24 from the filter head 22.

While a number of embodiments are contemplated, for the arrangement illustrated in FIGS. 9–12, each of the teeth 106 preferably includes a first end flank 110, a second end flank 111, a heel 114, a toe 118, and a side flank 124. The first and second end flanks 110, 111 provide a surface 116 that accepts the rotary forces translated to it from the bowl 30. As such, each of the end flanks 110, 111 is constructed to have a surface area large enough to make meaningful contact with the interlock arrangement on the bowl. In the one illustrated, each of the end flanks 110, 111 extends generally normal to the outer surface 102, but could vary between 80–100° relative to the outer surface 102.

Each of the teeth 106, in the illustrated embodiment, includes each of the first and second end flanks 110, 111 extending from the heel 114 to the toe 118. Further, in the illustrated embodiment, each of the side flanks 124 also extends from the heel 114 to the toe 118. Each of the side flanks 124 intersects each of the first and second end flanks 110, 111 to define corners 125, 126. Each of the side flanks 124 is also preferably extending generally normal to the outer surface 102, but could vary between 80–100° relative to the outer surface 102.

Still in reference to FIG. 9, each of the toes 118 include at least a first bevel surface 112 extending from one of the first and second end flanks 110, 111 and is preferably angled obliquely relative to the respective end flank 110, 111. In the particular embodiment illustrated, each of the toes 118 further includes a second bevel surface 113 that extends from the other of the end flanks 110, 111 for each tooth 106 and is angled obliquely relative to that particular end flank 110, 111.

Figure 12:
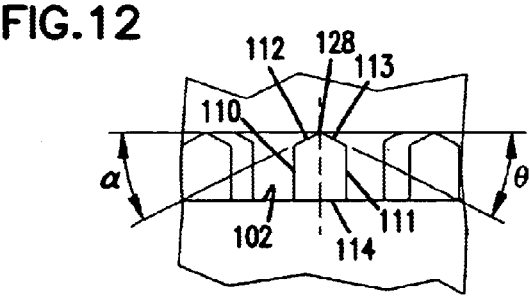
FIG. 12 is a fragmented, enlarged, schematic, side elevational view of three of the teeth utilized in the end cap depicted in FIGS. 9–11.

In reference now to FIG. 12, a fragmented, enlarged, side elevational view of tooth 106 is shown. The angle of the first bevel surface 112 relative to the first end flank 110 is shown at reference character $\alpha$. Similarly, the angle which the second bevel surface 113 extends relative to the second end flank 111 is shown by the reference character $\theta$. In preferred arrangements, the angles $\alpha$ and $\theta$ are equal to each other. In other embodiments, these angles may differ from each other. In the particular embodiment illustrated, each of the angles $\alpha$ and $\theta$ is at least 10°, no greater than 60°, and typically 20–45°. One preferred angle used for $\alpha$ and $\theta$ is 30°. Still in reference to FIG. 12, it can be seen that each of the bevel surfaces 112, 113 intersect and define a corner 128. The overall height of each tooth 106 from the heel 114 to the corner 128, which represents the furthermost point from surface 102, is at least 2 mm, no greater than 100 mm, in many instances 3–20 mm, and in the particular illustrated embodiment, is 7 mm.

From reviewing FIGS. 9 and 12, it can be appreciated that each of the teeth 106, as depicted in the drawings, has the profile of a five-sided polygon. Another term to describe the shape is "house shaped." By "house shaped", it is meant generally a rectangular profile with a triangular shape on top of the rectangle.

FIG. 11 depicts other features of this particular end cap 52. The end cap 52 depicted includes an outer surrounding wall 130 forming an annular portion 132 and an end wall 134 forming the axial surface 122. The end wall 134 defines a central opening 136 that allows the filter cartridge 32 to be mounted and dismounted over the center tube 34. An internal pair of rings 138, 140 define a cup 142 for holding and supporting the media extension 48 therein. In preferred arrangements, the cup 142 helps to hold urethane potting material in order to secure the media 48 to the end cap 52.

In reference now to FIG. 10, it can be seen that in the particular embodiment illustrated, each of the teeth 106 is evenly spaced around the opening 136. In the one shown, each tooth 106 is spaced at angle $\beta$ relative to an adjacent tooth 106, as centered along the corner 128. Angle β will vary based upon the number of teeth 106 that are desired. For three or fewer teeth, the angle β will be greater than 90°, but less than 180°. For the particular arrangement shown when there are eighteen teeth 106, the angle θ is at least 5°, no greater than 40°, typically 10–30°, and in the one shown is 20°.

Figure 6:
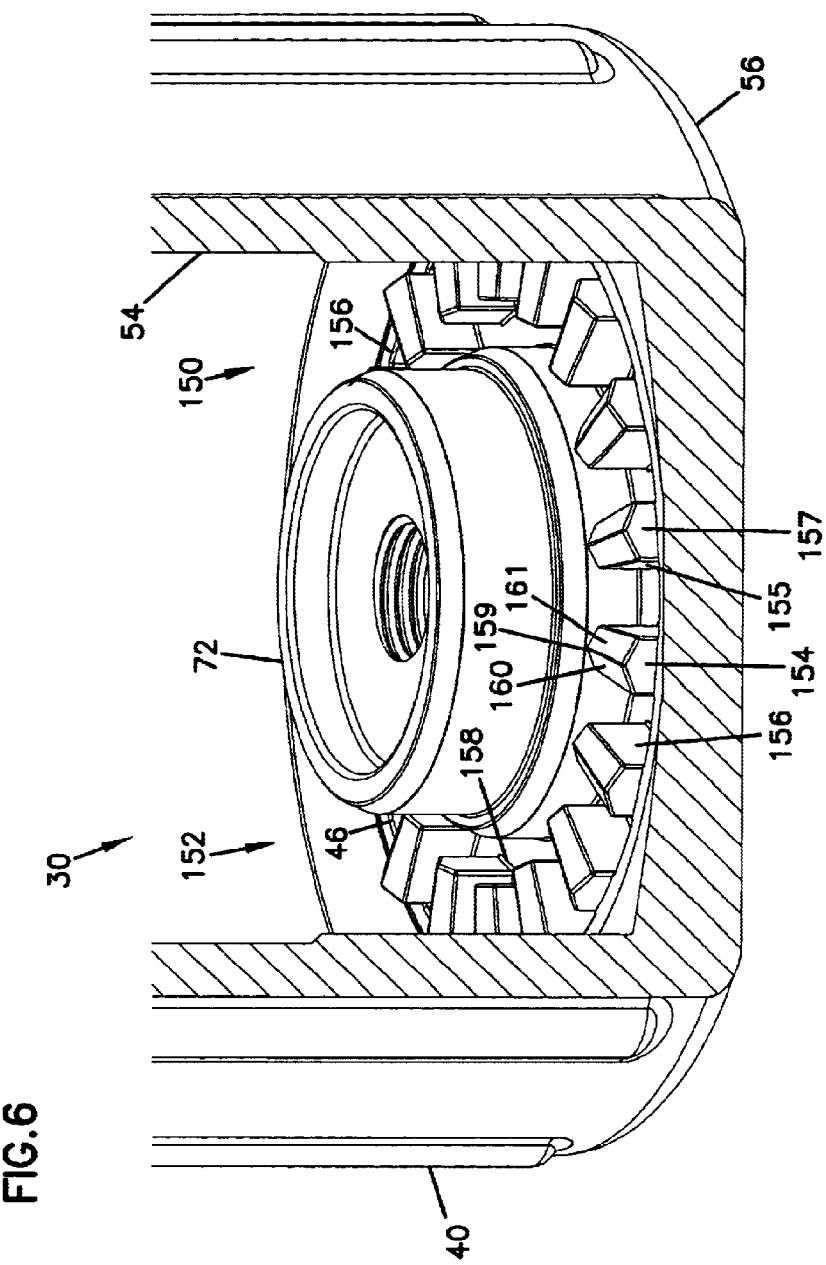
FIG. 6 is a schematic, perspective, partially fragmented view of the filter bowl depicted in FIGS. 1–3.
Figure 7A:
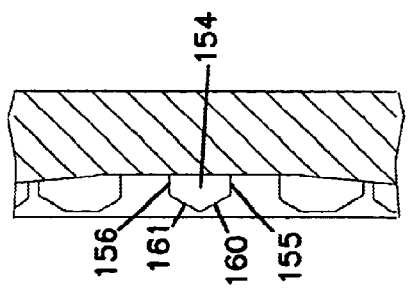
FIG. 7A is a fragmented, enlarged, schematic, side elevational view of three of the teeth utilized in the filter bowl depicted in FIGS. 6–8, and as taken along the line 7A—7A of FIG. 7.
Figure 7:
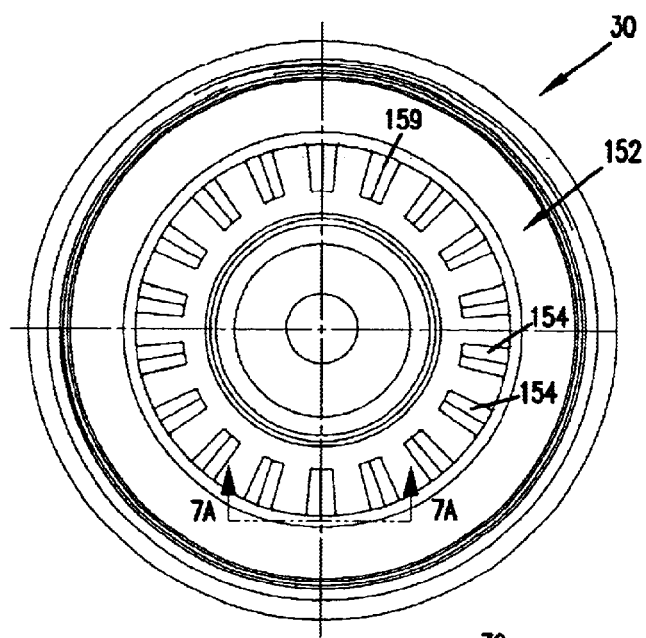
FIG. 7 is a top plan view of the filter bowl depicted in FIGS. 1–3.
Figure 8:
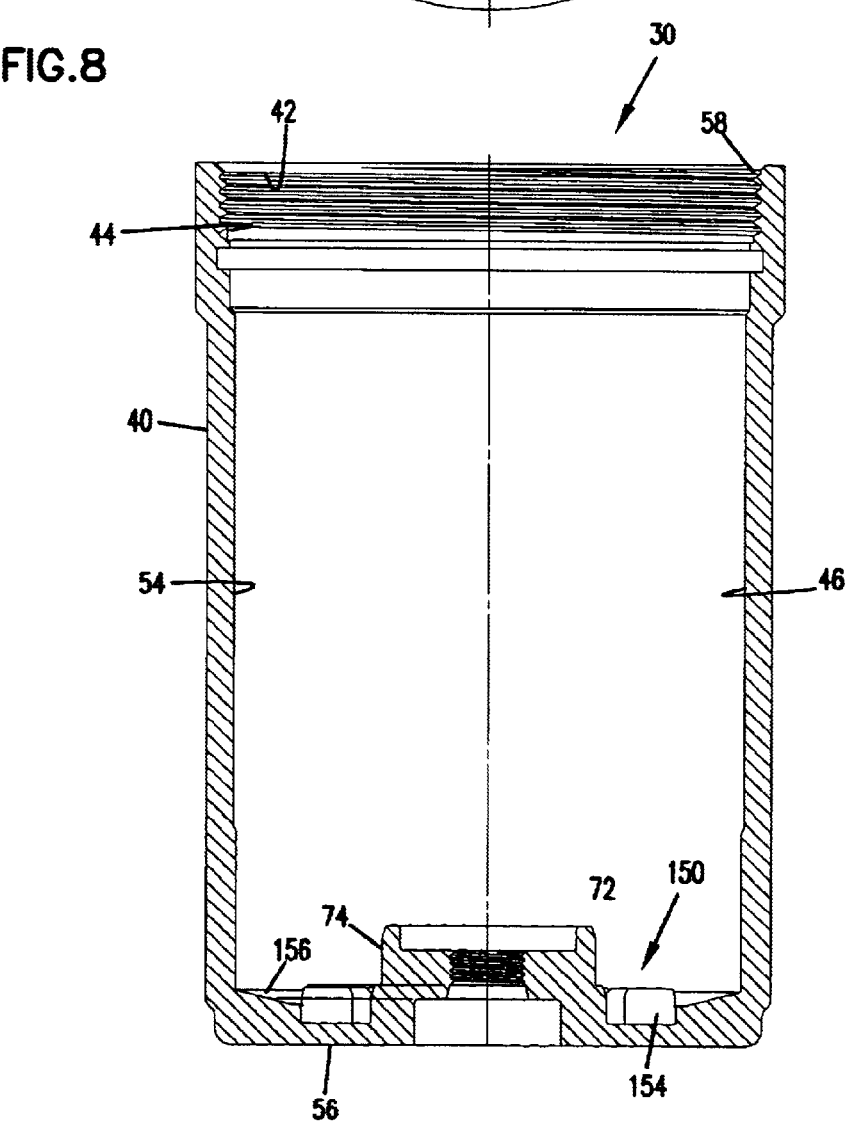
FIG. 8 is a schematic, cross-sectional view of the filter bowl taken along the line 8—8 of FIG. 7.

Turning now to FIGS. 6–8, the portion of the cooperating interlock arrangement 80 on the bowl 30 is depicted as a bowl interlock arrangement generally at 150.

In the preferred embodiment illustrated, the bowl interlock arrangement 150 is oriented within the interior 54 of the bowl 30 in a location that results in a mating, meshing, engaging, or interlocking with the cartridge interlock arrangement 100. As shown in FIGS. 6–8, the bowl interlock arrangement 150 is located on the interior surface 46 of the closed end 56 of the bowl 30.

The preferred bowl interlock arrangement 150 comprises a cog construction 152 having at least one tooth 154. In preferred arrangements, there will be at least a first and second tooth 154. The particular embodiment illustrated has 18 teeth 154 arranged in a circle, each of the teeth 154 being evenly spaced around the projection 72 along the bottom 156 of the bowl 30. In many preferred arrangements, there will be no more than 30 teeth 154, and typically 5–25 teeth.

Each of the teeth 154 extends or projects in an axial direction from the bottom 156. This projection is to allow for the teeth 154 to engage the teeth 106 of the cartridge interlock arrangement 100. In many embodiments, there is the same number of teeth 154 on the bowl interlock arrangement 150 as there are teeth 106 on the cartridge interlock arrangement 100. In other embodiments, there can be fewer or more teeth 106 on the cartridge interlock arrangement 100 than on the bowl interlock arrangement 150.

In the particular illustrated embodiment, each of the teeth 154 has the same shape as each of the teeth 106. As such, each of the teeth 104 has first and second end flanks 155, 156; a side flank 157; a heel 158; and a toe 159. The toe 159 includes a first bevel surface 160 and a second bevel surface 161. In the particular embodiment illustrated, the first and second bevel surfaces 160, 161 are angled relative to the end flanks 155, 156 at the same angles α and β, as described above, with respect to FIG. 12.

FIG. 3 illustrates the interlock arrangement 80, including the cartridge interlock arrangement 100 and the bowl interlock arrangement 150 in cooperative engagement. In particular, one of the end flanks 110, 111 of the cartridge interlock arrangement 100 engages one of the end flanks 155, 156 of the bowl interlock arrangement 150 for each of the teeth 106 and teeth 154. In this manner, when the bowl 30 is turned in a rotary motion relative to the filter head 22 in order to threadably release the bowl 30 from the filter head 22, one of the end flanks 155, 156 of each of the teeth 154 of the bowl 30 engages and urges against one of the end flanks 110, 111 of the teeth 106 of the cartridge interlock arrangement 100. Thus, this translates the rotary force from the bowl 30 to the filter cartridge 32. This helps to result in a filter cartridge 32 that is removed with the bowl 30, when the bowl 30 is being removed from the filter head 22.

The filtration system 20 is utilized as follows: The bowl-cartridge filter 24 including the bowl 30 with the filter cartridge 32 operably installed therein is mounted onto the filter head 22. This is done by rotating the bowl 30 relative to the filter head 22 in a manner to threadably engage the bowl 30 to the filter head 22. Liquid to be cleaned flows through the filter head 22, into the bowl-cartridge filter 24, through the media 48 where particulates are trapped, out of the bowl-cartridge filter 24 into the filter head 22, and then out of the filter head 22. After a period of use, the filter media 48 will become clogged or occluded. At this point, the bowl-cartridge filter 24 should be serviced.

To service the bowl-cartridge filter 24, the bowl-cartridge filter 24 is rotated relative to the filter head in the opposite direction as it was rotated to install it to unthread and release the bowl 30 from the filter head. While the bowl 30 is rotated relative to the filter head, the cartridge filter 32 is simultaneously rotated with the filter head 32 release the cartridge filter 32 from the filter head 22. This step of simultaneously rotating the filter cartridge 32 relative to the filter head 22 includes using the interlock arrangement 150 on the bowl 30 to urge the interlock arrangement 100 that extends from the second end cap 52 on the cartridge filter 32 in a rotary motion. In particular, one of the end flanks 155, 156 in each of the teeth 154 engages and pushes against one of the respective end flanks 110, 111 on a respective tooth 106 on the cartridge interlock arrangement 100.

After the bowl-cartridge filter 24 has been removed from the filter head 22, the filter cartridge 32 is removed from the bowl 30 by grasping the handle member 92 and pulling the filter cartridge 32 out of the bowl 30 through the opening 58. This act of pulling also releases the seal 62 between the filter cartridge 32 and the bowl 30.

After the filter cartridge 32 has been removed from the bowl 30, the filter cartridge 32 is discarded. In preferred arrangements, the filter cartridge 32 is constructed of at least 95%, and preferably 100% non-metallic materials. Non-metallic materials allows the filter cartridge 32 to be incinerated.

A new filter cartridge 32 is then installed within the bowl 30. This is done by placing the filter cartridge 32 through the open end 58 of the bowl 30, and sliding it over the central core 34. The interlock arrangement 100 is aligned with the interlock arrangement 150, such that the cog construction 152 is oriented to mesh or engage with the cog construction 104. The seal 62 between the filter cartridge 32 and the bowl 30 is formed. This provides a refurbished bowl-cartridge filter 24, which may then be installed on the filter head 22.

C. The Arrangement of FIGS. 13–15

Figure 13:
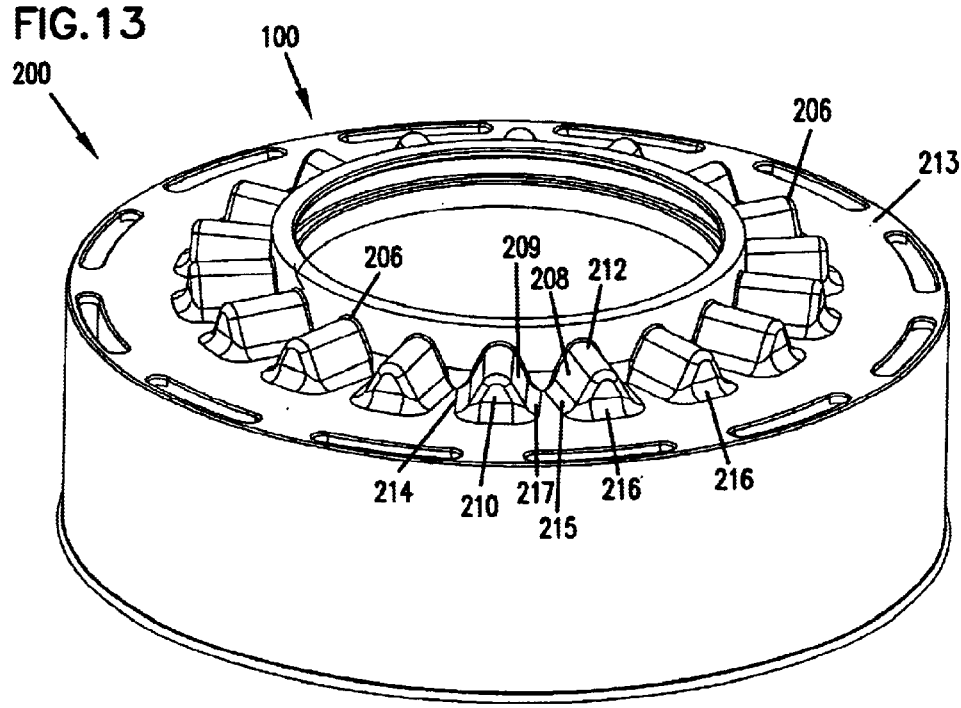
FIG. 13 is a perspective view of an alternate embodiment of an end cap that may be utilized as part of the filter cartridge depicted in FIGS. 2–5.
Figure 14:
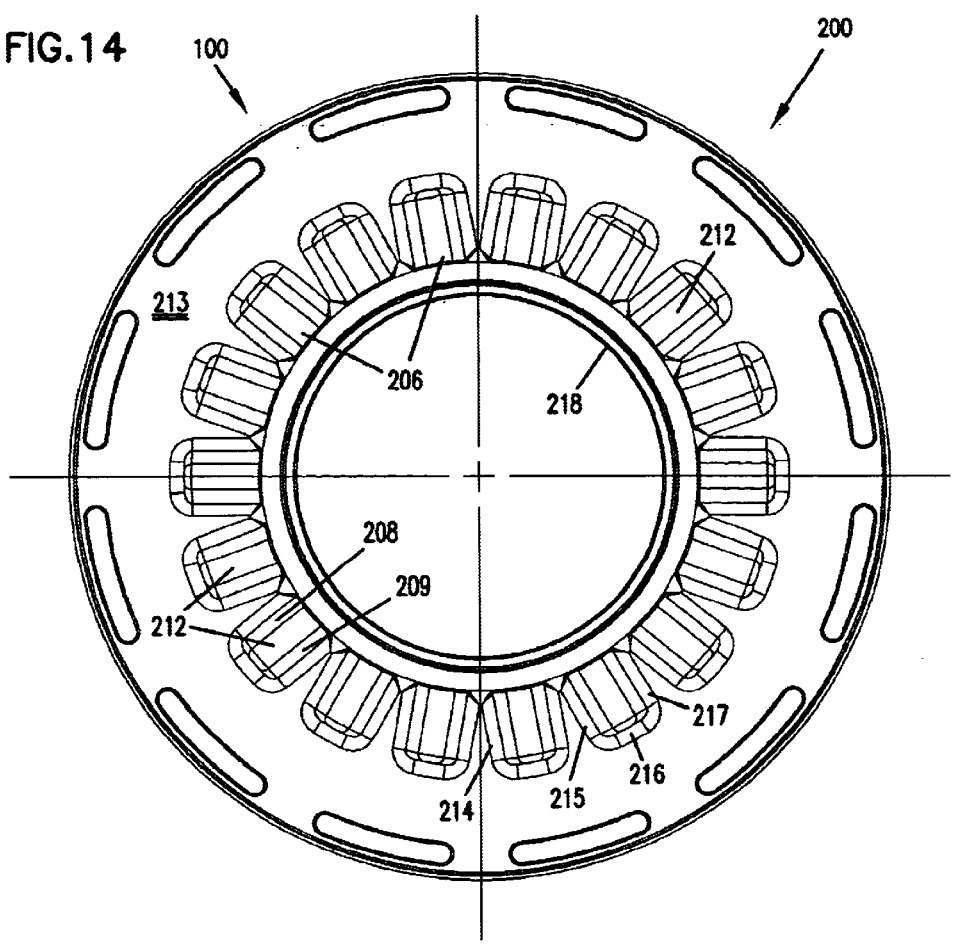
FIG. 14 is a top plan view of the end cap depicted in FIG. 13.
Figure 15:
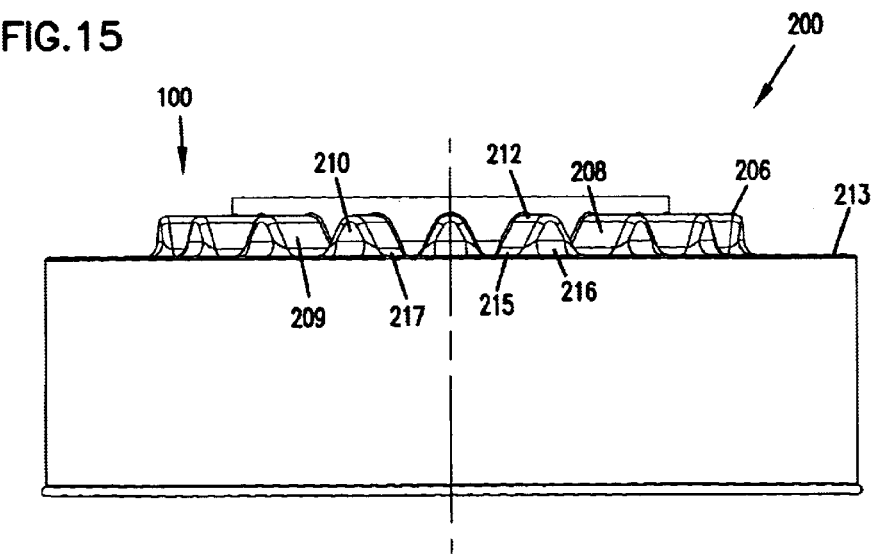
FIG. 15 is a side elevational view of the end cap depicted in FIGS. 13 and 14.

FIGS. 13–15 illustrate an alternate embodiment of cartridge interlock arrangement 100 on an end cap 200. In this particular embodiment, each of the teeth 206 has the shape of a truncated A. As such, each of the teeth 206 includes a first end flank 208, a second end flank 209, a side flank 210, and a toe 212. In the arrangement depicted, the toe 212 is smooth and curved, to bridge or connect first end flank 208 to the second end flank 209.

Each tooth 206 also includes a heel 214, which forms a bridge between an outer surface 213 and each of the first end flank 208, second end flank 209, and side flank 210. In this instance, the heel 214 includes first, second, and third bevel surfaces 215, 216, and 217. The first bevel surface 215 forms a transition between the outer surface 213 and the first end flank 208. Similarly, the second bevel surface 216 provides a transition between the outer surface 213 and the side flank 210. Finally, the third bevel surface 217 provides a transition between the outer surface 213 and the second end flank 209.

In reference to FIG. 14, it can be seen that in the particular embodiment illustrated, there are eighteen teeth 206. Each tooth 206 is generally evenly spaced about the center aperture 218, and evenly spaced between each respective tooth 206. The end cap 200 shown in FIGS. 13–15 may be used to engage the filter bowl interlock arrangement 150 as described herein. Alternatively, the end cap 200 may be used to engage a filter bowl interlock arrangement that has teeth shaped identically as teeth 206.

D. The Arrangement of FIGS. 16–21

In FIGS. 16–21, another alternative embodiment of the cartridge interlock arrangement 100 is illustrated utilizing an alternate end cap 552. In this case, for the arrangement illustrated in FIGS. 16–18, each of the teeth 506 preferably includes an end flank 510, a bevel surface 512, and a heel 514. The end flank 510 provides a surface 516 that may accept the rotary forces translated to it from the bowl 30. As such, the end flank 510 is preferably constructed to have a surface area large enough to make meaningful contact with the interlock arrangement on the bowl 30. In the one illustrated, the end flank 510 extends generally normal to the outer surface 502, but could vary between 80–100 degrees relative to the outer surface 502.

The end flank 510 defines a toe 518 at an end point of the end flank 510. The bevel surface 512 preferably extends at least partially from the heel 514 to the toe 518. While the bevel surface 512 is depicted in the drawings as being at an oblique angle with respect to the end flank 510, it is contemplated that in other arrangements, the teeth 506 can be rectangular in shape and have a non-angled surface 512.

In the arrangement depicted, the heel 514 is at the joint 520 (FIG. 17) where the tooth 506 and the outer surface 502 of the end cap 552 intersect. The bevel surface 512 is angled obliquely with respect to the end flank 510 starting at the heel 514. In preferred arrangements, the bevel surface 512 is angled relative to the end flank 510 of at least 92 degrees, no greater than 160 degrees, and usually 93–150 degrees. In many arrangements, this angle is 95–120 degrees. When measured relative to the axial surface 522 of the second end cap 552, this angle translates into the above-mentioned angles, minus 90 degrees; thus, at least 2°, no greater than 70°, usually 3–60°, and in many arrangements, 5–30°.

Figure 16:
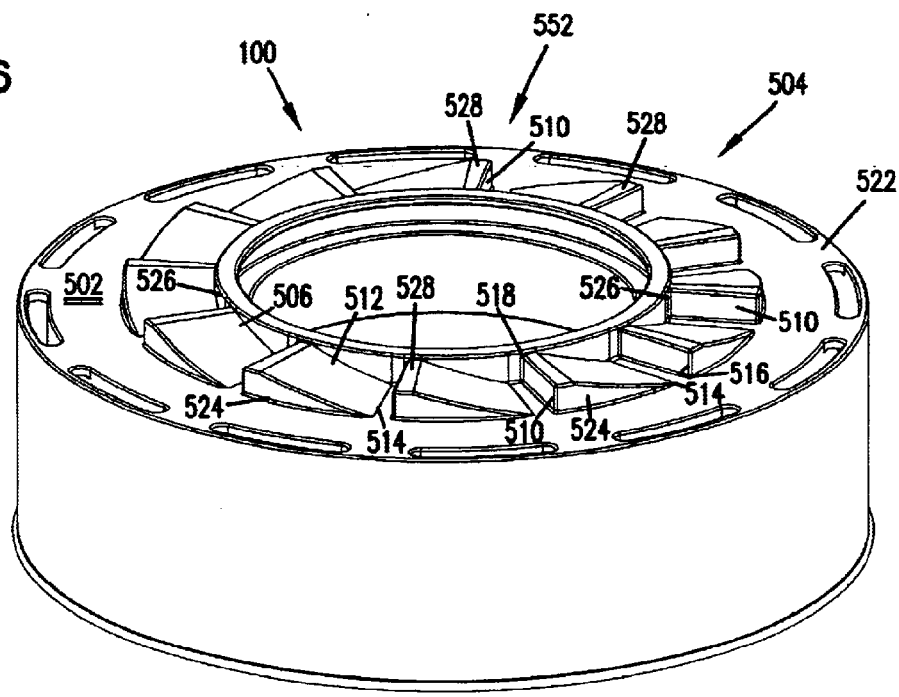
FIG. 16 is a perspective view of another alternate end cap that may be utilized as part of the cartridge filter depicted in FIGS. 2–5.

The depicted teeth 506 further include a pair of side flanks 524, 526 extending from the outer surface 502 to the bevel surface 512, which helps provide structural support for the end flank 510. As can be seen in FIG. 16, the particular side flank 524 depicted has a generally triangular shape, with a similar shape for the side flank 526. Further, in the particular embodiment depicted, each of the teeth 506 further defines a land 528 extending from the bevel surface 512 to the toe 518 and the end flank 510. The land 528 helps to provide a transition between the end flank 510 and the bevel surface 512 and avoid sharp corners or other projections, which may damage other components of the bowl-cartridge filter 24.

From reviewing FIG. 16, it can be appreciated that each of the teeth 506 as depicted has the general appearance of a pie wedge. Each of the pie wedges in the form of the teeth 506 projects or extends outwardly in an axial direction from the axial surface 522 of the outer surface 502 of the second end cap 552.

Figure 18:
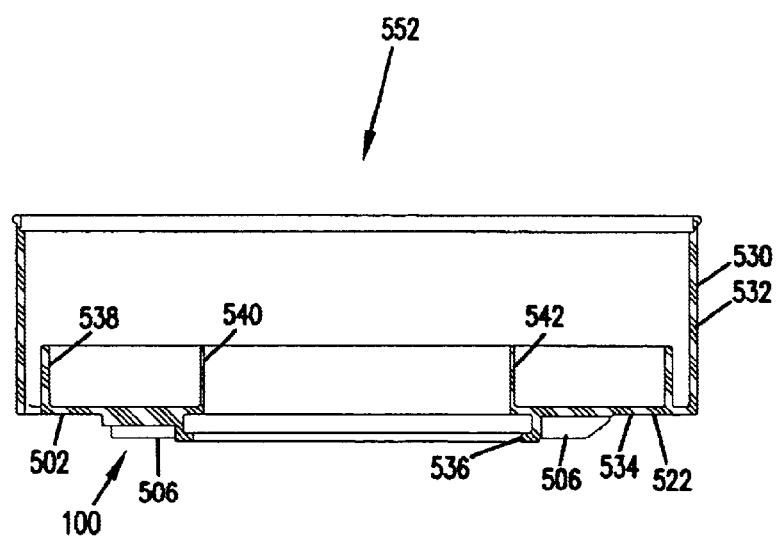
FIG. 18 is a schematic, cross-sectional view of the end cap, the cross-section taken along the line 18—18 of FIG. 17.
Figure 17:
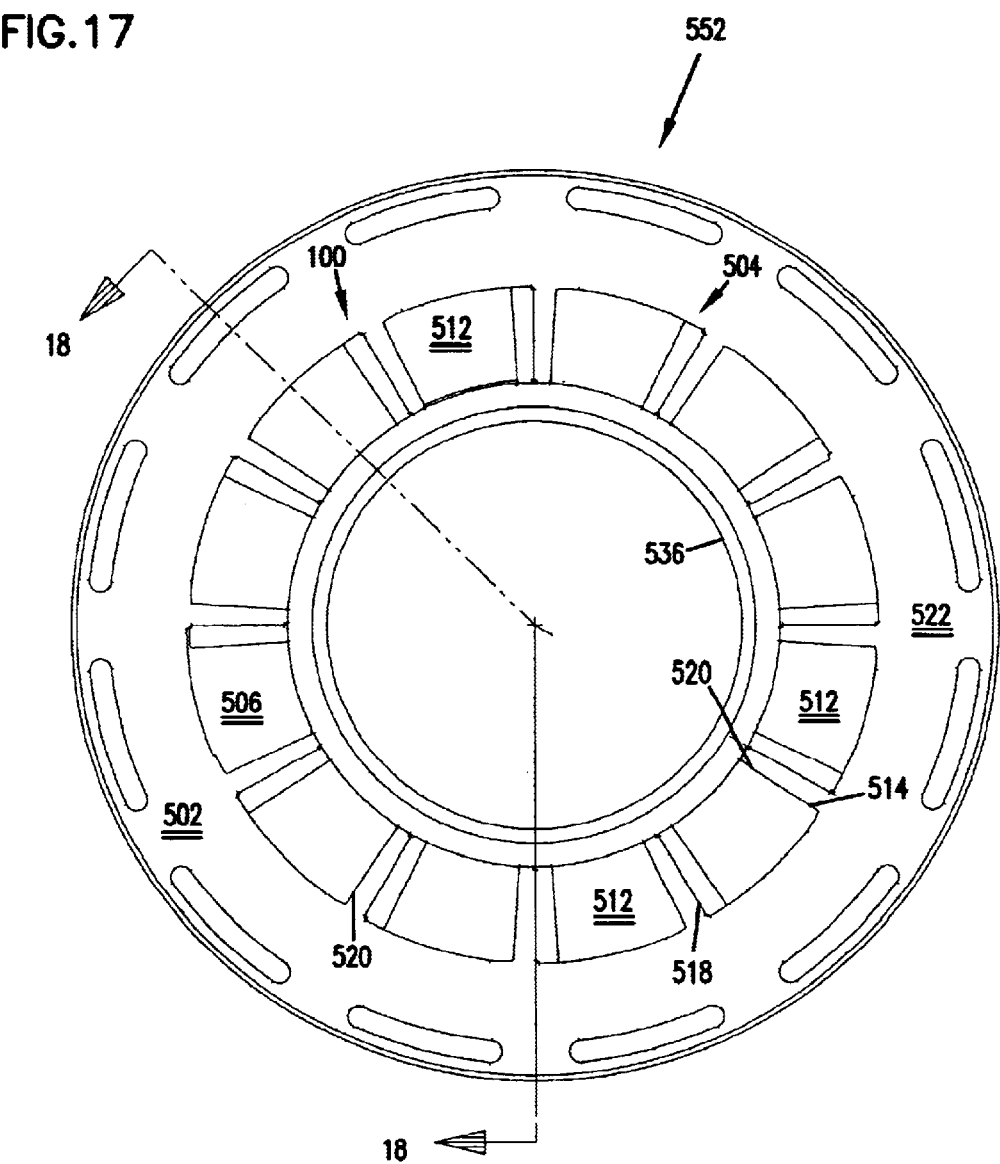
FIG. 17 is a top plan view of the end cap depicted in FIG. 16.

FIG. 18 depicts other features of this particular end cap 552. The end cap 552 depicted includes an outer surrounding wall 530 forming an annular portion 532 and an end wall 534 forming the axial surface 522. The end wall 534 defines a central opening 536 that allows the filter cartridge 32 to be mounted and dismounted over the center tube 34. An internal pair of rings 538, 540 define a cup 542 for holding and supporting the media extension 48 therein. In preferred arrangements, the cup 542 helps to hold urethane potting material in order to secure the media 48 to the end cap 552. In the embodiment depicted, each of the teeth 506 is evenly spaced around the opening 536. Each of the teeth extends at least 2 mm, no greater than 20 mm, and preferably 3–5 mm from the axial surface 522. This will generally correspond with the overall height of the end flank 510.

Figure 19:
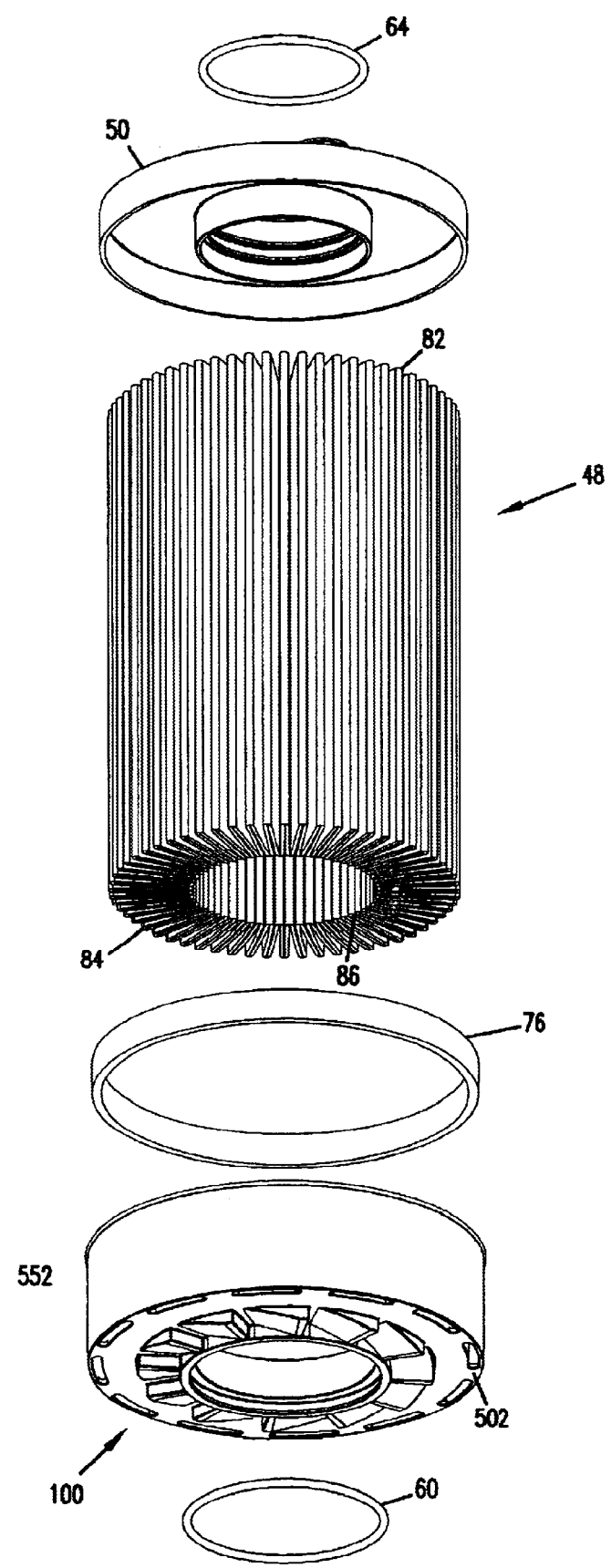
FIG. 19 is an exploded, perspective view of the filter cartridge depicted in FIGS. 2 and 3, but with the end cap shown in FIGS. 16–18.

FIG. 19 shows the filter cartridge 32 in exploded, perspective view, with the alternate end cap 552. Other than the alternate end cap 552, the filter cartridge 32 is the same as described above with respect to FIG. 4.

Figure 21:
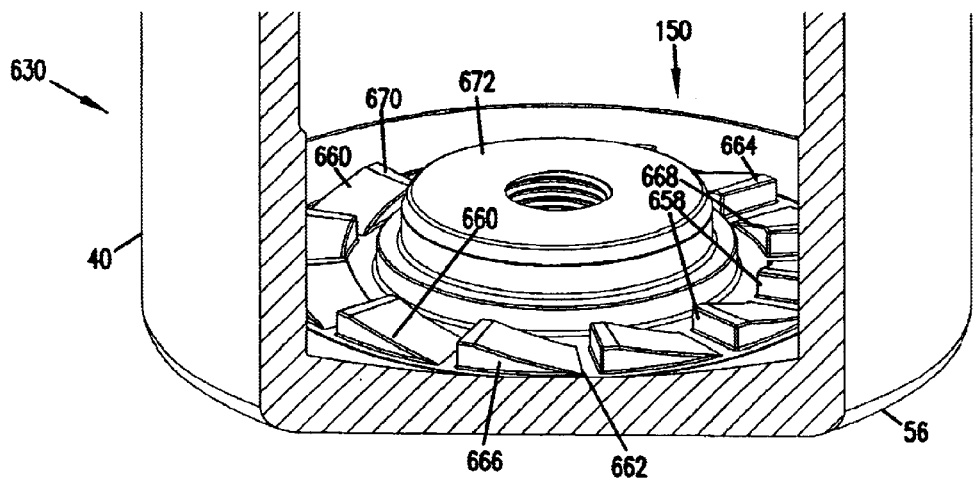
FIG. 21 is a schematic, perspective, partially fragmented view of the filter bowl depicted in FIG. 20.
Figure 20:
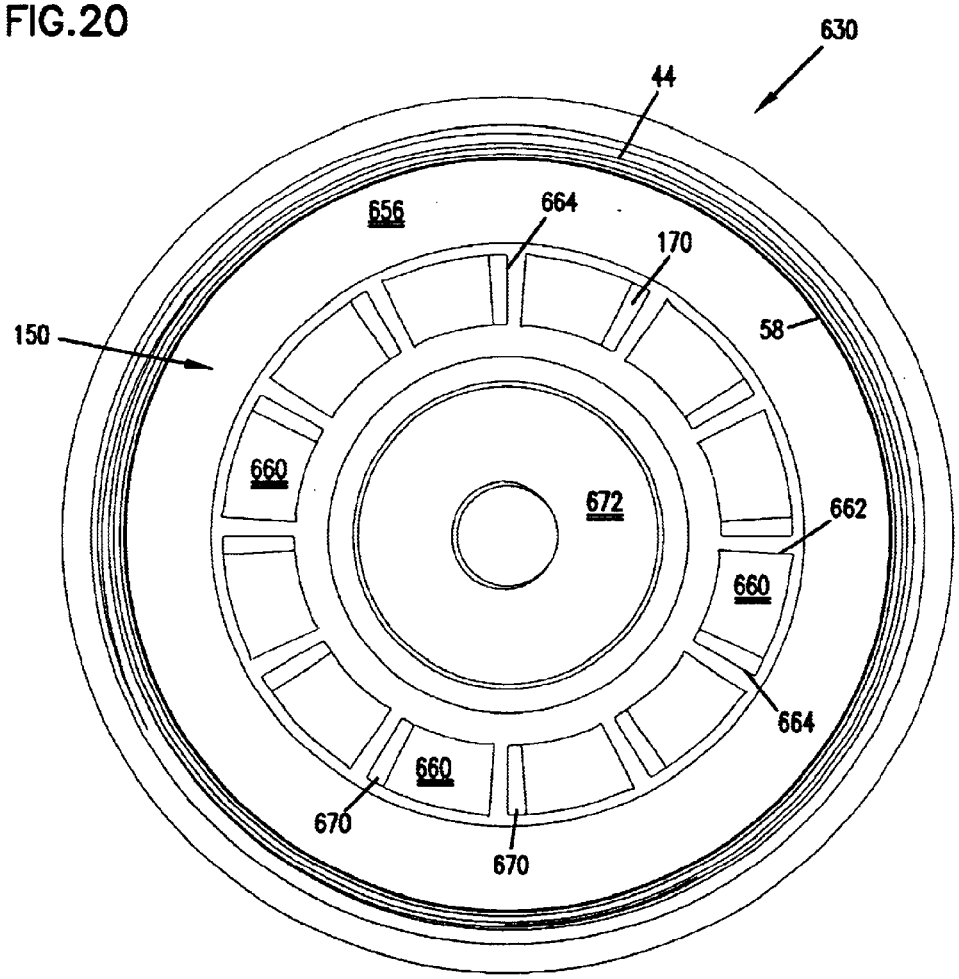
FIG. 20 is a top plan view of an alternate embodiment of a filter bowl usable with the end cap of FIGS. 16–19.
Figure 23:
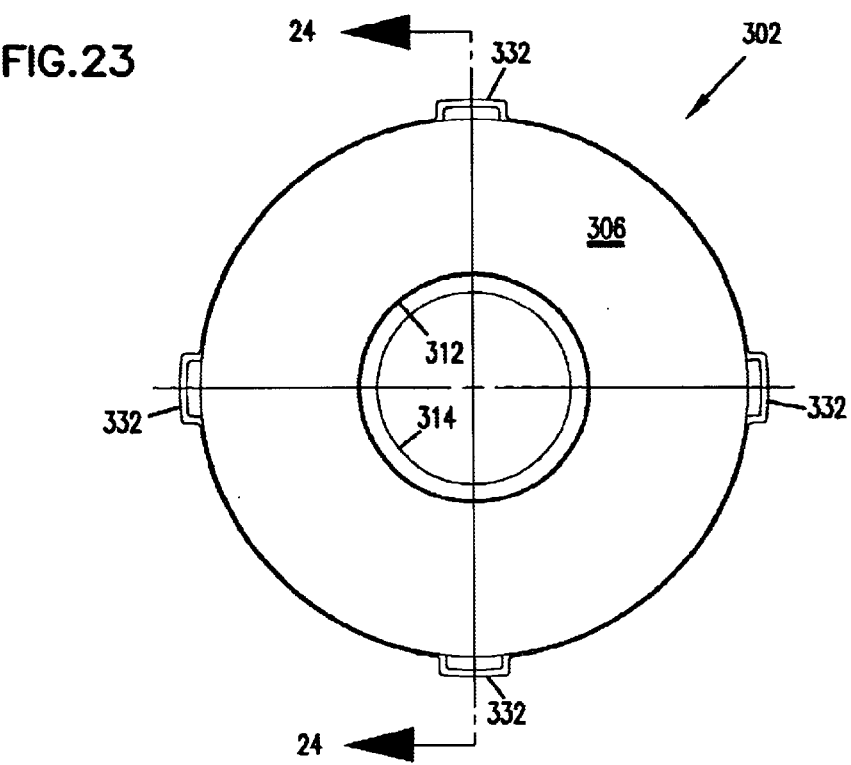
FIG. 23 is a top plan view of the cartridge filter depicted in FIG. 22 when assembled.
Figure 24:
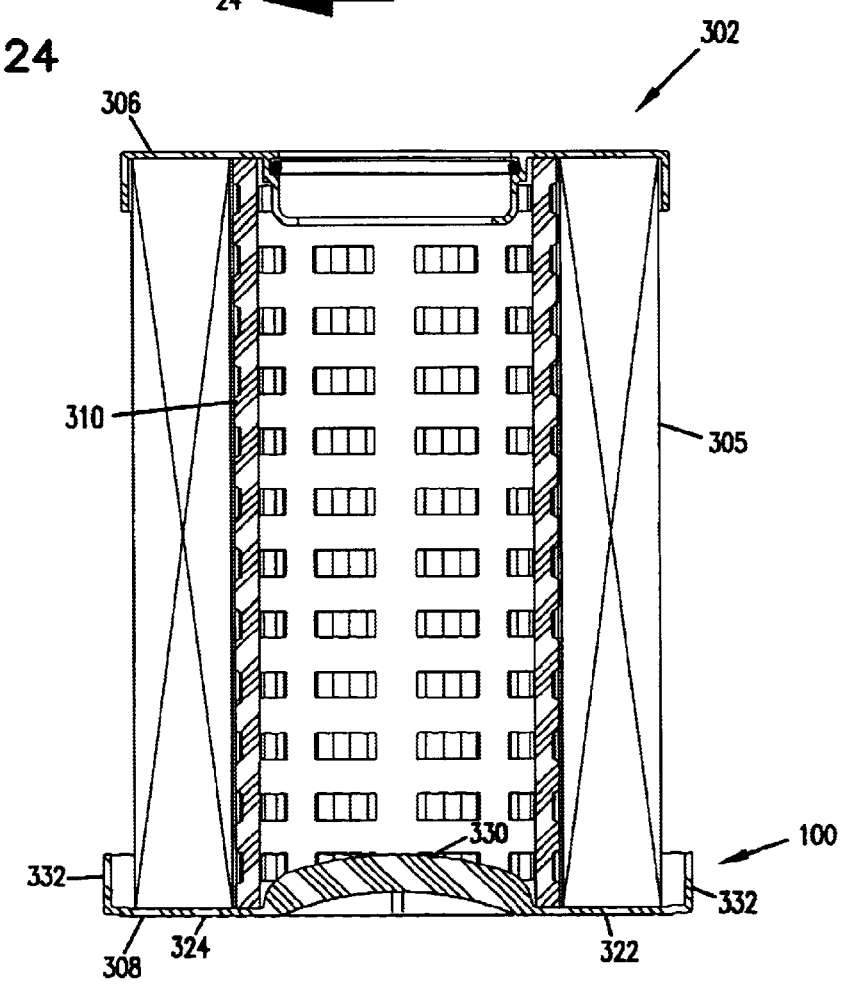
FIG. 24 is a cross-sectional view of the cartridge filter depicted in FIGS. 22 and 23, the cross-section being taken along the line 24—24 of FIG. 23.

FIGS. 20 and 21 illustrate the bowl 630 and including an alternate bowl interlock arrangement 150, configured to mate, engage, or mesh with the alternate interlock arrangement for end cap 552. The interlock arrangement 150 of the bowl 630 includes a plurality of teeth 664, which are shaped complimentary and analogously as the teeth 506 for the end cap 552. As such, each of the teeth 664 includes an end flank 668, a bevel surface 660, a heel 662, a toe 664, a pair of side flanks 666, 668, and a top land 670.

Each of the teeth 664 extends from the bottom surface 656 of the bowl 640 far enough to engage and mesh with the interlock arrangement 100 on the end cap 552. As can be seen in FIG. 20, each of the teeth 654 is evenly spaced around the projection 672. Each of the teeth 654 extends at least 2 mm, no greater than 20 mm, and in many instances, 3–5 mm from the bottom surface 656. This generally corresponds to the overall height of the end flank 658.

E. The Arrangement of FIGS. 22–31

Figure 28:
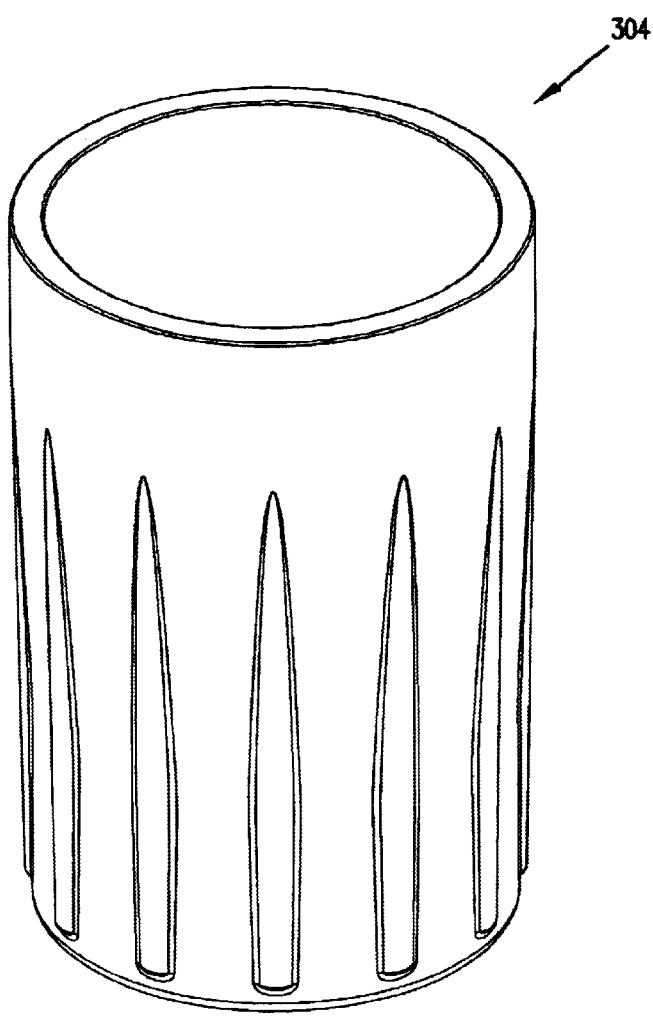
FIG. 28 is a perspective view of a filter bowl useable with the filter cartridge depicted in FIGS. 22–25.
Figure 27:
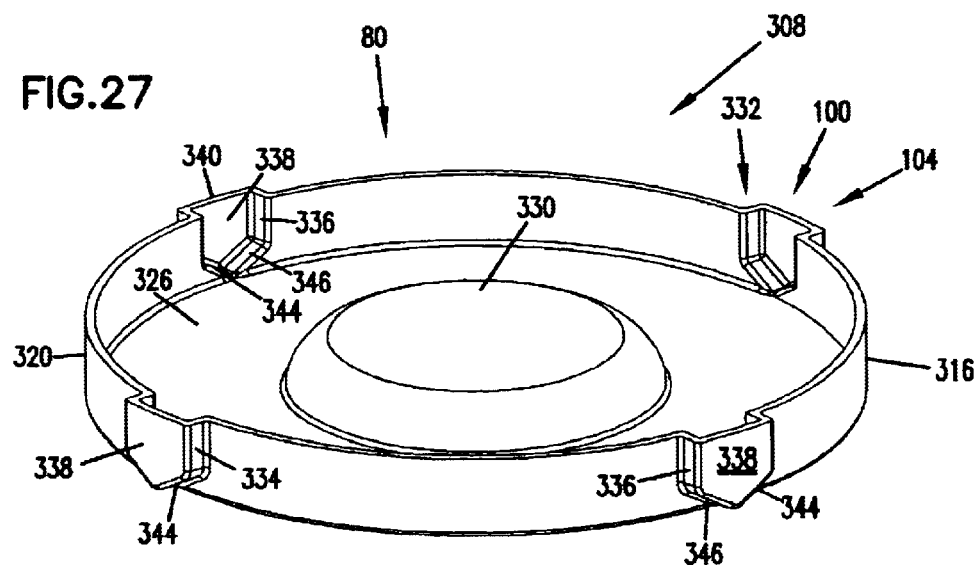
FIG. 27 is a perspective view of the end cap utilized on the cartridge filter depicted in FIGS. 22–25.
Figure 29:
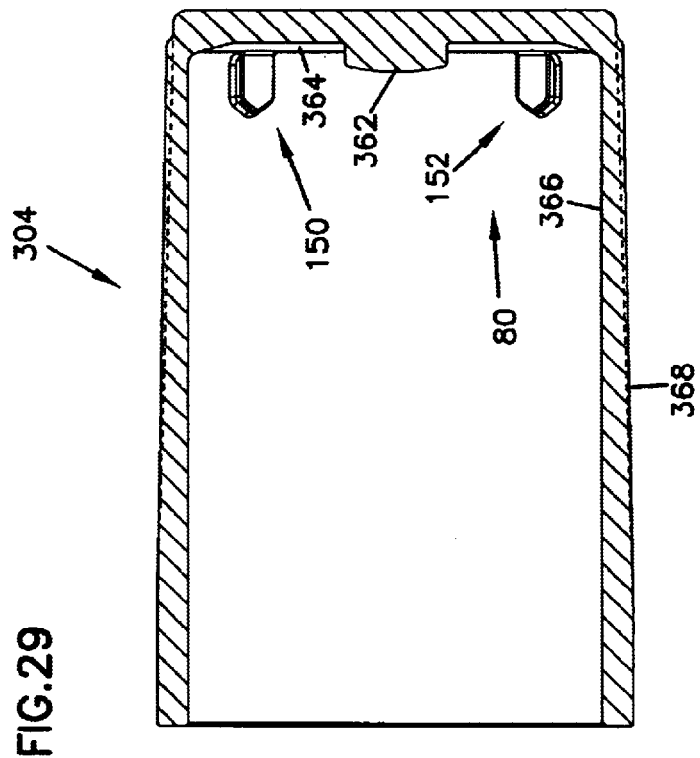
FIG. 29 is a schematic, cross-sectional view of the filter bowl depicted in FIG. 28.
Figure 30:
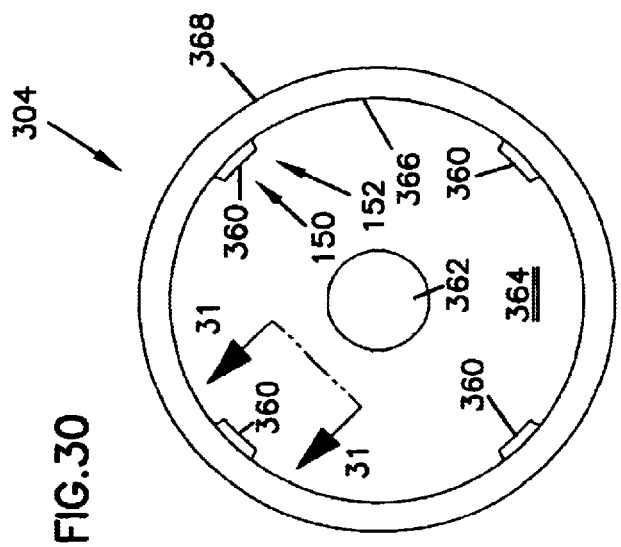
FIG. 30 is a top plan view of the filter bowl depicted in FIG. 28.

FIGS. 22–31 illustrate another embodiment of a bowl-cartridge filter. The bowl-cartridge filter is analogous to the arrangements described above in that it includes a filter cartridge 302 that is removeable and replaceable within a bowl 304 (FIGS. 28–30).

In reference first to FIG. 22, the particular filter cartridge 302 illustrated includes an extension of filter media 305 extending between a first end cap 306 and a second end cap 308. The filter media 305 is supported by an inner support tube or inner liner 310. The cartridge filter 302 includes an O-ring 312 mounted within an opening 314 in the first end cap 306 to create a seal with the filter head 22, as described above in connection with the embodiment of FIGS. 1–12.

The end cap 308 depicted includes an outer surrounding wall 318 forming an annular portion 320 and an end wall 322 forming an axial surface 324. The end wall 322, in this embodiment, is solid, non-porous, to form a closed surface 326. The closed surface 326 defines vanes 328 to provide strength to the end cap 308. There is also a projection 330 extending from the end wall 322 in a direction toward the first end cap 306, which functions to provide internal strength to the filter cartridge 302.

As with the above embodiments, the bowl-cartridge filter of FIGS. 22–31 includes cooperative interlock arrangement 80 to help insure the removal of the filter cartridge 302 from the filter head 22 at the same time the bowl 304 is removed from the filter head 22. The filter cartridge 302 includes interlock arrangement 100, which forms part of the cooperative interlock arrangement 80 between the cartridge 302 and the bowl 304. In the embodiment of FIGS. 22–31, the cartridge interlock arrangement 100 extends from outer surface 316 of the second end cap 308. In particular, the interlock arrangement 100 extends from the annular portion 320.

As with the above embodiments, the cartridge interlock arrangement 100 depicted forms cog construction 104 in order to cooperate with compatible structure in the bowl 304. The cog construction 104 includes at least one cog or tooth 332 extending from the outer surface 316 of the second end cap 308. In this particular embodiment, each of the teeth 332 extends from the annular portion 320 of the outer surface 316 of the second end cap 308. As with the embodiment of FIGS. 1–12, the teeth 332 in this embodiment are illustrated as having the profile of a five-sided polygon. In other words, the shape is "house shaped." It should be appreciated that other shapes of the teeth 332 can be used, including the shapes described in connection with FIGS. 13–21.

Each of the teeth 332 has a first end flank 334, a second end flank 336, a side flank 338, a heel 340, and a toe 342. The first and second end flanks 334, 336 extending from the heel 340 to the toe 342. The side flank extends from the heel 340 to the toe 342 and intersects each of the first and second end flanks 334, 336. The toe 342 includes a first bevel surface 344 extending from the first end flank 334 and being angled obliquely relative to the first end flank 334. The toe 342 also includes a second bevel surface 346 extending from and being angled obliquely relative to the second end flank 336.

Figure 26:
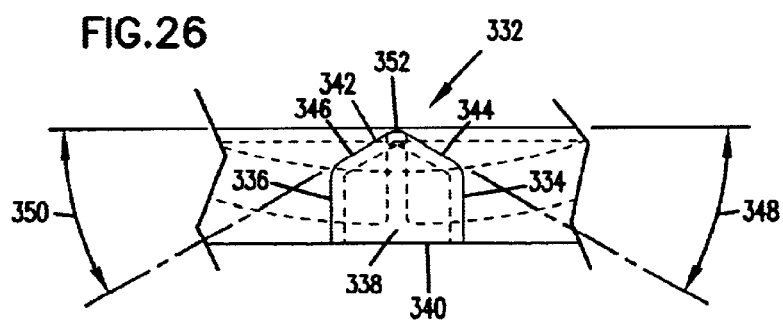
FIG. 26 is a schematic, enlarged, side elevational view of a portion of the end cap for the cartridge filter depicted in FIGS. 22–24.

In FIG. 26, there is illustrated the angles 348, 350 of the first bevel surface 344 relative to the first end flank 334 and the second bevel surface 346 relative to the second end flank 336. In preferred arrangements, the angles 348, 350 are equal to each other. In other embodiments, these angles may differ from each other. In the particular embodiment illustrated, each of the angles 348, 350 is at least 10°, no greater than 60°, and typically 20°–45°. One preferred angle used for angles 348 and 350 is 300. Still in reference to FIG. 26, it can be seen that each of the bevel surfaces 344, 346 intersects and defines the corner 352. The overall height of each tooth 332 from the heel 340 to the corner 352 is at least 2 mm, no greater than 100 mm, in many instances 3–20 mm, and in the particular example, is 9 mm.

Figure 25:
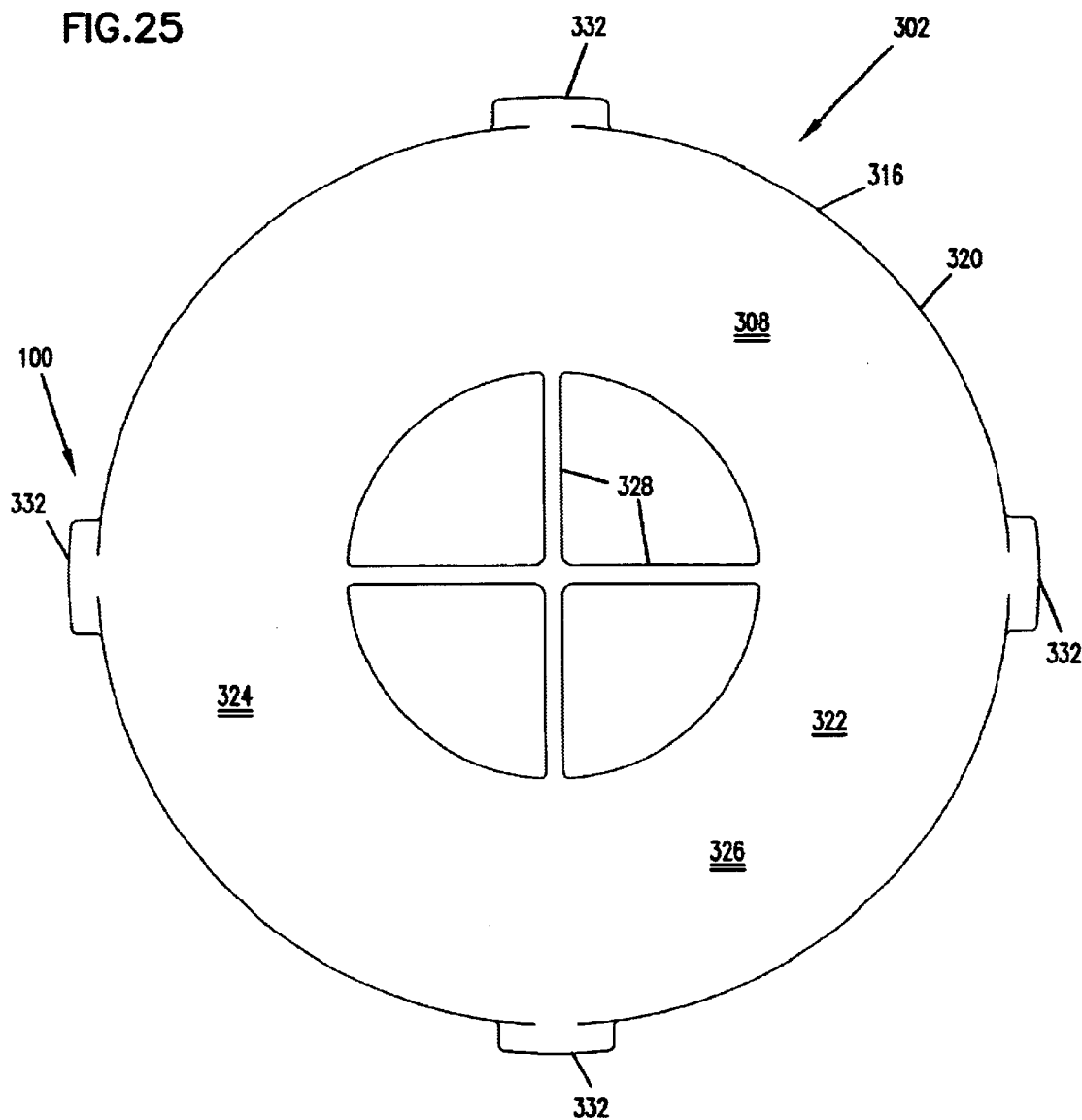
FIG. 25 is a bottom plan view of the cartridge filter depicted in FIGS. 22–24.

In FIG. 25, it can be seen that in the particular embodiment illustrated, there are at least two teeth 332, preferably at least three teeth 332, and in the one shown, there are four teeth 332. Each of the teeth 332 is evenly spaced around the annular portion 320. For the example shown, there is an angle of 90° between each of the teeth 332.

Figure 31:
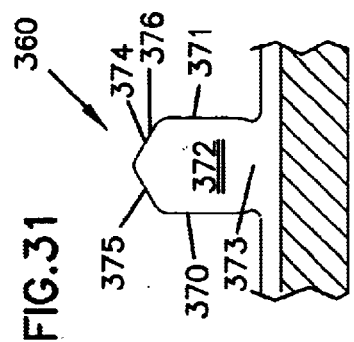
FIG. 31 is a schematic, fragmented, enlarged side elevational view of an inside section of the filter bowl, the section being shown along line 31—31 of FIG. 30.

Turning now to FIGS. 29–31, the portion of the cooperating interlock arrangement 80 on the bowl 304 is depicted as bowl interlock arrangement generally at 150. As with the above embodiments, the preferred bowl interlock arrangement 150 comprises cog construction 152 having at least one tooth 360. In preferred arrangements, there will be at least a first and a second tooth 360. The particular embodiment illustrated as four teeth 360 arrangement in a circle, each of the teeth 360 being evenly spaced around the projection 362 along the bottom 364 of the bowl 304. The projection 362 engages and is received within the recess 329 (FIG. 22) defined by the second end cap 308.

Each of the teeth 360 extends or projects in an axial direction from an internal surface 366 of a side wall 368 of the bowl 304. This arrangement allows the teeth 360 to engage the teeth 332 of the cartridge interlock arrangement 100. In many embodiments, there is the same number of teeth 360 as teeth 332. In other embodiments, there can be fewer or more teeth on the cartridge interlock arrangement 100 than on the bowl interlock arrangement 150.

In the particular illustrated embodiment in FIG. 31, each of the teeth 360 has the same shape as each of the teeth 332. As such, each of the teeth 360 has first and second end flanks 370, 371; a side flank 372; a heel 373; and a toe 374. The toe 374 includes a first bevel surface 375 and a second bevel surface 376. The first and second bevel surfaces 375, 376 are angled relative to the end flanks 370, 371 at the same angles 348, 350 as described above with respective to FIG. 26.

What is claimed is:

1. A bowl-cartridge filter arrangement configured for operable installation onto a filter head by rotation in a first direction and removal from the filter head by rotation in an opposite, second direction; the bowl-cartridge filter arrangement comprising:
   (a) a filter bowl having an interior surface; said filter bowl including a filter bowl interlock arrangement extending from said filter bowl interior surface;
      (i) said filter bowl interlock arrangement including at least a first tooth;
         (A) said first tooth including an end flank, a heel, and a toe; said toe including at least one bevel surface; said bevel surface extending at least partially from said toe to said heel and being angled obliquely relative to said end flank;
   (b) a disposable cartridge filter operably mounted in and selectively removable from the bowl; the filter cartridge comprising:
      (i) an extension of filter media; said extension having a first end and an opposite second end;
      (ii) a first end cap secured to said extension of filter media at said first end; and
      (iii) a second end cap secured to said extension of filter media at said second end; said second end cap including an outer surface, and a filter cartridge interlock arrangement extending from said outer surface;
         (A) said filter cartridge interlock arrangement engaging said first tooth of said filter bowl interlock arrangement, when the bowl-cartridge filter is rotated in the second direction to remove the bowl-cartridge filter from the filter head.

2. A bowl-cartridge filter arrangement according to claim 1 wherein:
   (a) said filter cartridge interlock arrangement includes at least a first tooth extending from said outer surface;
      (i) said first tooth of said filter cartridge interlock arrangement engaging said first tooth of said filter bowl interlock arrangement, when the bowl-cartridge filter is rotated in the second direction to remove the bowl-cartridge filter from the filter head.

3. A bowl-cartridge filter arrangement according to claim 2 wherein:
   (a) said first tooth of said filter cartridge interlock arrangement includes a first end flank, a side flank, a toe, and a heel;
      (i) said first end flank of said first tooth of said filter cartridge interlock arrangement extending from at least partially from said toe to said heel of said first tooth of said filter cartridge interlock arrangement;
      (ii) said side flank of said first tooth of said filter cartridge interlock arrangement extending from said heel to said toe and intersecting said first end flank of said first tooth of said filter cartridge interlock arrangement; and
      (iii) said toe of said first tooth of said filter cartridge interlock arrangement including at least a first bevel surface extending from said first end flank and being angled obliquely relative to said first end flank of said first tooth of said filter cartridge interlock arrangement.

4. A bowl-cartridge filter arrangement according to claim 3 wherein:
   (a) said first end flank of said first tooth of said filter cartridge interlock arrangement is oriented to engage said end flank of said first tooth of said filter bowl interlock arrangement, when the bowl-cartridge filter is rotated in the second direction to remove the bowl-cartridge filter from the filter head.

5. A bowl-cartridge filter arrangement according to claim 3 wherein:
    (a) said filter bowl interlock arrangement further includes a second tooth;
        (i) said second tooth including an end flank, a heel, and a toe; said second tooth toe including at least one second tooth bevel surface; said second tooth bevel surface extending at least partially from said second tooth toe to said second tooth heel and being angled obliquely relative to said second tooth end flank.

6. A bowl-cartridge filter arrangement according to claim 5 wherein:
    (a) said filter cartridge interlock arrangement further includes a second tooth; said second tooth of said filter cartridge interlock arrangement including a first end flank, a side flank, heel, and a toe.

7. A bowl-cartridge filter arrangement according to claim 6 wherein:
    (a) said first end flank of said first tooth of said filter cartridge interlock arrangement is oriented to engage said end flank of said first tooth of said filter bowl interlock arrangement, and said first end flank of said second tooth of said filter cartridge interlock arrangement is oriented to engage said end flank of said second tooth of said filter bowl interlock arrangement, when the bowl-cartridge filter is rotated in the second direction to remove the bowl-cartridge filter from the filter head.

8. A bowl-cartridge filter arrangement according to claim 2 wherein:
    (a) said filter cartridge interlock arrangement includes at least 3 teeth; each of said filter cartridge interlock arrangement teeth including:
        (i) a first end flank, a second end flank, a side flank, a heel, and a toe;
        (ii) said first and second end flanks and said side flank of each of said at least 3 filter cartridge interlock arrangement teeth extending from said heel to said toe;
        (iii) said toe of each of said at least 3 filter cartridge interlock arrangement teeth including first and second bevel surfaces extending from respective first and second end flanks; and
    (b) said filter bowl interlock arrangement includes at least 3 teeth; each of said filter bowl interlock arrangement teeth including:
        (i) an end flank, a bevel surface, and a heel;
        (i) said end flank of each of said at least 3 filter bowl interlock arrangement teeth including a toe;
        (ii) said bevel surface of each of said at least 3 filter bowl interlock arrangement teeth extending at least partially from said toe to said heel and being angled obliquely relative to said end flank.

9. A bowl-cartridge filter arrangement according to claim 1 wherein:
    (a) said bowl includes an open end and a closed end; said filter bowl interlock arrangement extending from said interior surface of said closed end.

10. A bowl-cartridge filler arrangement according to claim 9 wherein:
    (a) said bowl includes a threaded region adjacent to said open end for releasable attachment to a filter head.

11. A method of servicing a bowl-cartridge filter operably installed on a filter head; the bowl-cartridge filter including a bowl and a cartridge filter selectively removable from the bowl; the cartridge filter including an extension of filter media between first and second opposite end caps; the method including:
    (a) rotating the bowl relative to the filter head to release the bowl from the filter head;
    (b) while rotating the bowl relative to the filter head, simultaneously rotating the cartridge filter relative to the filter head to release the cartridge filter from the filter head;
        (i) wherein the step of simultaneously rotating the cartridge filter relative to filter head includes using an interlock arrangement on the bowl to urge an interlock arrangement extending from one of the first and second end caps on the cartridge filter in a rotary motion;
            (A) the bowl interlock arrangement including at least a first tooth including an end flank, a heel, and a toe; the toe including at least one bevel surface; the bevel surface extending at least partially from said toe to said heel and being angled obliquely relative to the end flank.

12. A method according to claim 11 wherein:
    (a) the cartridge filter interlock arrangement extends from an outer surface of the second end cap; and
    (b) said step of simultaneously rotating includes rotating the bowl interlock arrangement against the cartridge filter interlock arrangement extending from the outer surface of the second end cap.

13. A method according to claim 12 wherein:
    (a) the cartridge filter interlock arrangement includes at least a first tooth extending from the outer surface of the second end cap;
    (b) said step of simultaneously rotating includes engaging the first tooth of the filter cartridge interlock arrangement against the first tooth of the filter bowl interlock arrangement.

14. A method according to claim 13 wherein:
    (a) the first tooth of said filter cartridge interlock arrangement includes a first end flank, a side flank, a toe, and a heel;
        (i) the first end flank of the first tooth of said filter cartridge interlock arrangement extending from at least partially from the toe to the heel of the first tooth of the filter cartridge interlock arrangement;
        (ii) the side flank of the first tooth of the filter cartridge interlock arrangement extending from the heel to the toe and intersecting the first end flank of the first tooth of the filter cartridge interlock arrangement; and
        (iii) the toe of the first tooth of the filter cartridge interlock arrangement including at least a first bevel surface extending from the first end flank and being angled obliquely relative to the first end flank of the first tooth of the filter cartridge interlock arrangement;
    (b) said step of simultaneously rotating includes engaging the first end flank of the first tooth of the filter cartridge interlock arrangement against the end flank of the first tooth of the filter bowl interlock arrangement.

15. A filter cartridge for use in a bowl-cartridge filter; the bowl-cartridge filter configured for operable installation onto a filter head by rotation in a first direction and removal from the filter head by rotation in an opposite, second direction; the bowl-cartridge filter including a bowl and a cartridge filter for selective mounting in and removal from the bowl; the filter cartridge comprising:

(a) an extension of filter media; said extension having a first end and an opposite second end;
(b) a first end cap secured to said extension of filter media at said first end; and
(c) a second end cap secured to said extension of filter media at said second end; said second end cap including an outer surface, and a filter cartridge interlock arrangement;
   (i) said filter cartridge interlock arrangement including at least a first tooth and a second tooth extending from said outer surface; said first tooth and second tooth each being oriented to engage the filter bowl, when the filter cartridge is mounted in the filter bowl and the bowl is rotated in the second direction to remove the bowl-cartridge filter from the filter head;
   (ii) each of said first tooth and second tooth including first and second end flanks, a side flank, a heel, and a toe;
      (A) said first and second end flanks extending from said heel to said toe;
      (B) said side flank extending from said heel to said toe and intersecting each of said first and second end flanks;
      (C) said toe including at least a first bevel surface extending from said first end flank and being angled obliquely relative to said first end flank;
      (D) said toe of each of said first tooth and second tooth further including a second bevel surface extending from and being angled obliquely relative to said second end flank;
      (E) said first bevel surface of each of said first tooth and second tooth is oriented at an angle of 10–60° relative to the respective first end flank of each of said first tooth and second tooth; and
      (F) said second bevel surface of each of said first tooth and second tooth is oriented at an angle of 10–60° relative to the respective second end flank of each of said first tooth and second tooth.

16. A filter cartridge according to claim 15 wherein:
(a) said second end cap includes an outer surrounding wall and an end wall;
   (i) said end wall defining an axial surface;
   (ii) said outer surrounding wall defining an annular portion;
      (A) each of said axial surface and said annular portion comprising a portion of said second end cap outer surface.

17. A filter cartridge according to claim 16 wherein:
(a) each of said first and second tooth extends from said annular portion.

18. A filter cartridge according to claim 15 wherein:
(a) said extension of filter media is cylindrical;
(b) said filter media comprises cellulose; and
(c) said filter media is bonded to said first and second end caps by a urethane potting.

19. A filter cartridge for use in a bowl-cartridge filter; the bowl-cartridge filter configured for operable installation onto a filter head by rotation in a first direction and removal from the filter head by rotation in an opposite, second direction; the bowl-cartridge filter including a bowl and a cartridge filter for selective mounting in and removal from the bowl; the filter cartridge comprising:

(a) an extension of filter media; said extension having a first end and an opposite second end;
(b) a first end cap secured to said extension of filter media at said first end; and
(c) a second end cap secured to said extension of filter media at said second end; said second end cap including an outer surface, and a filter cartridge interlock arrangement;
   (i) said filter cartridge interlock arrangement including at least 3 teeth; each of said teeth including:
      (A) a first end flank, a second end flank, a side flank, a heel, and a toe;
         (1) each of the first end flanks and second end flanks extending from a respective heel to a respective toe;
         (2) each of the side flanks extending from a respective heel to a respective toe and intersecting respective first and second end flanks; and
         (3) each of the toes including a first bevel surface and a second bevel surface; the first bevel surface extending from the first end flank; and the second bevel surface extending from the second end flank.

20. A filter cartridge according to claim 19 wherein:
(a) said second end cap includes an outer surrounding wall and an end wall;
   (i) said end wall defining an axial surface;
   (ii) said outer surrounding wall defining an annular portion;
      (A) each of said axial surface and said annular portion comprising a portion of said second end cap outer surface.

21. A filter cartridge according to claim 20 wherein:
(a) each of said first and second tooth extends from said annular portion.

22. A filter cartridge according to claim 19 wherein:
(a) said extension of filter media is cylindrical;
(b) said filter media comprises cellulose; and
(C) said filter media is bonded to said first and second end caps by a urethane potting.

* * * * *

UNITED STATES PATENT AND TRADEMARK OFFICE
CERTIFICATE OF CORRECTION

PATENT NO. : 6,752,924 B2
DATED : June 22, 2004
INVENTOR(S) : Gustafson et al.

It is certified that error appears in the above-identified patent and that said Letters Patent is hereby corrected as shown below:

Column 3,
Line 1, after "DETAILED" insert -- DESCRIPTION --;
Line 24, after "system" insert -- 20 --;

Column 5,
Line 11, delete "filly" and insert -- fully --;

Column 11,
Line 27, delete "300" and insert -- 30° --.

Signed and Sealed this

Thirtieth Day of November, 2004

JON W. DUDAS
*Director of the United States Patent and Trademark Office*